(12) United States Patent
Porter

(10) Patent No.: US 10,578,140 B2
(45) Date of Patent: Mar. 3, 2020

(54) MAGNETIC FASTENERS AND RELATED ARTICLES AND METHODS

(71) Applicant: James Blake Porter, Palo Alto, CA (US)

(72) Inventor: James Blake Porter, Palo Alto, CA (US)

( * ) Notice: Subject to any disclaimer, the term of this patent is extended or adjusted under 35 U.S.C. 154(b) by 300 days.

(21) Appl. No.: 14/794,540

(22) Filed: Jul. 8, 2015

(65) Prior Publication Data

US 2016/0032954 A1 Feb. 4, 2016

Related U.S. Application Data

(60) Provisional application No. 62/021,869, filed on Jul. 8, 2014.

(51) Int. Cl.
*F16B 1/00* (2006.01)
*F16B 12/12* (2006.01)
*H01F 7/02* (2006.01)

(52) U.S. Cl.
CPC ........... *F16B 12/12* (2013.01); *H01F 7/0205* (2013.01); *F16B 2001/0035* (2013.01)

(58) Field of Classification Search
CPC . F16B 2001/0035; F16B 12/12; H01F 7/0205
See application file for complete search history.

(56) References Cited

U.S. PATENT DOCUMENTS

| 970,721 | A | * | 9/1910 | Kirkpatrick et al. .... | A47B 3/12 108/154 |
| 3,355,195 | A | * | 11/1967 | Takayanagi ............. | E04G 1/151 403/364 |
| 3,425,474 | A | * | 2/1969 | Tummarello ......... | E04B 1/4107 411/103 |
| 4,358,214 | A | * | 11/1982 | Shull ....................... | F16B 12/12 403/178 |
| 4,403,886 | A | * | 9/1983 | Haeusler ............... | F16B 12/125 211/182 |
| 4,637,147 | A | * | 1/1987 | Wolsey .................... | D06C 3/08 144/347 |
| 4,889,329 | A | * | 12/1989 | Smith, Jr. ............ | B23Q 9/0042 269/2 |

(Continued)

FOREIGN PATENT DOCUMENTS

| GB | 1989-159794 | * | 6/1989 |
| WO | 2007080367 A1 | | 7/2007 |

OTHER PUBLICATIONS

"Magnetic modular furniture to your own design," www.yacube.eu, last accessed Dec. 30, 2015. Publication date unknown, but earlier than Jun. 14, 2015. Internet archive (wayback machine, web.archive.org, last accessed Dec. 30, 2015), indicates publication date as early as Jan. 12, 2015.

(Continued)

*Primary Examiner* — Jason W San
(74) *Attorney, Agent, or Firm* — Innovation Counsel LLP

(57) ABSTRACT

Magnetic fasteners, magnetic joints, and methods for making and using the magnetic fasteners and joints, and articles utilizing the magnetic fasteners and magnetic joints are provided. The magnetic fasteners and joints may be used in furniture, cabinetry, and the like, and enable facile and consistent assembly of furniture and cabinetry.

6 Claims, 16 Drawing Sheets

(56) References Cited

U.S. PATENT DOCUMENTS

| | | | | |
|---|---|---|---|---|
| 4,890,953 | A * | 1/1990 | Malatesta | E04B 1/2604 144/354 |
| 5,536,108 | A * | 7/1996 | Kvalheim | E06B 3/984 108/180 |
| 6,719,155 | B1 * | 4/2004 | Chang | B25H 3/04 206/350 |
| 6,824,220 | B1 * | 11/2004 | Davison | A47C 13/005 297/233 |
| 7,181,783 | B2 * | 2/2007 | O'Reilly | A47C 19/22 297/440.14 |
| 8,286,810 | B2 * | 10/2012 | Sabounjian | D06F 57/10 211/200 |
| 8,528,972 | B2 * | 9/2013 | Johnsson | A47C 4/02 297/233 |
| 8,596,090 | B1 * | 12/2013 | Smith | A44C 17/0216 24/303 |
| 8,783,778 | B2 * | 7/2014 | Nelson | A47C 13/005 248/188 |
| 9,277,813 | B2 * | 3/2016 | Nelson | A47B 87/00 |
| 9,949,563 | B2 * | 4/2018 | Kasza | A47B 57/42 |
| 2005/0167547 | A1 * | 8/2005 | McLellan | B60Q 1/2615 248/74.4 |
| 2006/0180055 | A1 | 8/2006 | Mulmed | |
| 2006/0181115 | A1 | 8/2006 | Mulmed | |
| 2008/0191105 | A1 | 8/2008 | Bagel | |
| 2009/0289090 | A1 * | 11/2009 | Fullerton | A45F 5/02 224/183 |
| 2010/0196088 | A1 | 8/2010 | Johnsson | |
| 2011/0049911 | A1 * | 3/2011 | Bosshard | E05C 17/56 292/251.5 |
| 2012/0216374 | A1 * | 8/2012 | Manuello | A41F 1/002 24/303 |
| 2012/0286631 | A1 * | 11/2012 | Larson | A47B 87/00 312/107 |
| 2012/0291501 | A1 * | 11/2012 | Gentile | E05B 47/0038 70/276 |
| 2013/0097817 | A1 * | 4/2013 | Hayton | A44B 11/06 24/303 |
| 2013/0149029 | A1 * | 6/2013 | Changsrivong | F16B 17/00 403/361 |
| 2013/0255044 | A1 * | 10/2013 | Chen | A47C 1/124 24/572.1 |
| 2014/0000068 | A1 * | 1/2014 | Casini | A44C 5/2071 24/303 |
| 2014/0053374 | A1 * | 2/2014 | Jepsen | A44C 5/18 24/303 |
| 2014/0105682 | A1 * | 4/2014 | Chen | F16B 1/00 403/376 |
| 2015/0159425 | A1 * | 6/2015 | Algar | E06B 7/28 52/202 |
| 2016/0003269 | A1 * | 1/2016 | Russell-Clarke | A41F 1/002 24/303 |
| 2016/0174715 | A1 * | 6/2016 | Nelson | A47C 31/003 297/440.14 |
| 2017/0067496 | A1 * | 3/2017 | Sutcliffe | F16M 11/041 |
| 2017/0234340 | A1 * | 8/2017 | Pensak | F16B 1/00 24/3.1 |
| 2017/0276159 | A1 * | 9/2017 | Robinson | F16B 12/48 |
| 2017/0321734 | A1 * | 11/2017 | Maertens | F16B 12/12 |
| 2018/0116394 | A1 * | 5/2018 | Mroue | A47B 47/0083 |
| 2018/0355900 | A1 * | 12/2018 | Nilsson | F16B 12/24 |

OTHER PUBLICATIONS

Youtube video entitled YaCUBE Magnetic modular furniture, www.yacube.eu, published on Aug. 29, 2014. www.youtube.com/watch?v=DiUSnal_n0A, last accessed Dec. 31, 2015, 1 page.

MAGfurniture from Benjamin Vermeulen, www.benjaminvermeulen.com/MAG-furniture.html, including embedded video (vimeo.com/61747410), last accessed Dec. 30, 2015. Publication date unknown, but earlier than Jun. 14, 2015. Internet archive (wayback machine, web.archive.org, last accessed Dec. 30, 2015) indicates publication date as early as Nov. 27, 2013.

Adam Williams, "Hex Key Be Gone! Flatpack Furniture Assembles Using Magnets," Dec. 17, 2013 (vwvw.gizmag.com/mag-flatpack-furniture-magnets/30138), last accessed Dec. 30, 2015, including 14 images, 16 pages.

Benjamin Vermeulen, "Flat-pack furniture assembled with magnets," dezeen magazine, Dec. 15, 2013 (www.dezeen.com/2013/12/15/flat-pack-furniture-assembled-with-magnets-by-benjamin-vermeulen/), last accessed Dec. 30, 2015, 7 pages.

"Magnetic furniture cuts assembly time down to a few minutes," Dec. 19, 2013, available at www.buymagnets.com/news/156/magnets-and-magnetic-materials/magnetic-furniture-cuts-assembly-time-down to a few minutes/, last accessed Dec. 30, 2015, 2 pages.

"Magnetic grain—Purveyor of magnetic & modular, reclaimed & reinvented, fun & functional wood goods," www.magneticgrain.com, last accessed Dec. 30, 2015. Publication date unknown, but earlier than Jun. 17, 2015. Internet archive (wayback machine, webarchive.org, last accessed Dec. 30, 2015) indicates publication date as early as May 15, 2010.

* cited by examiner

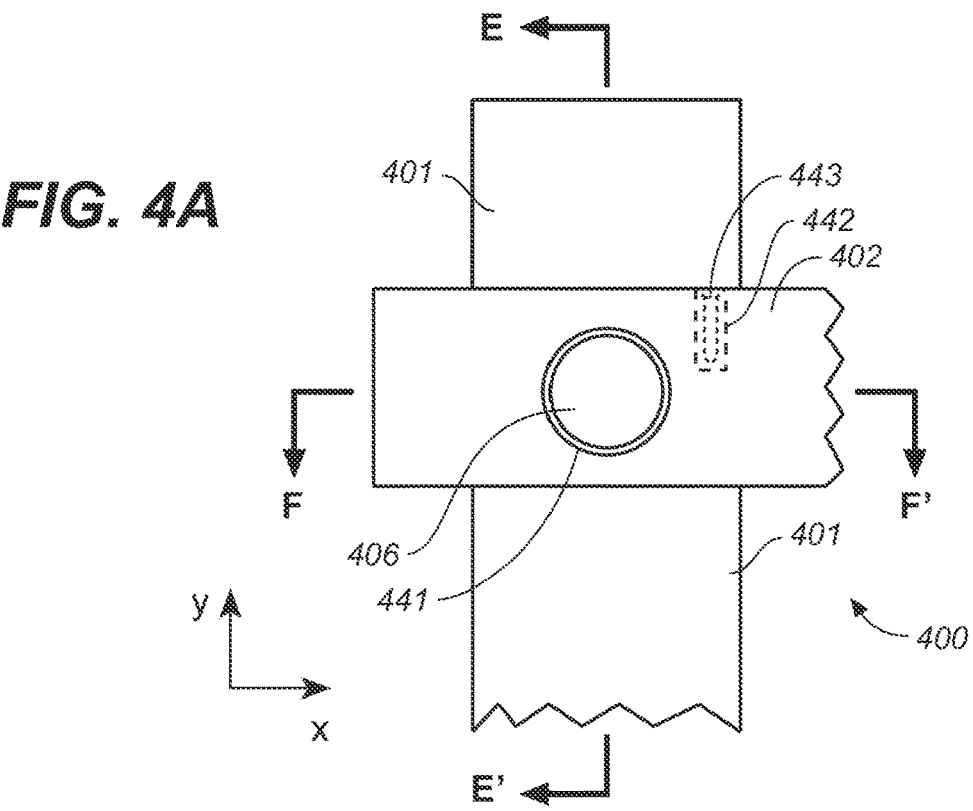
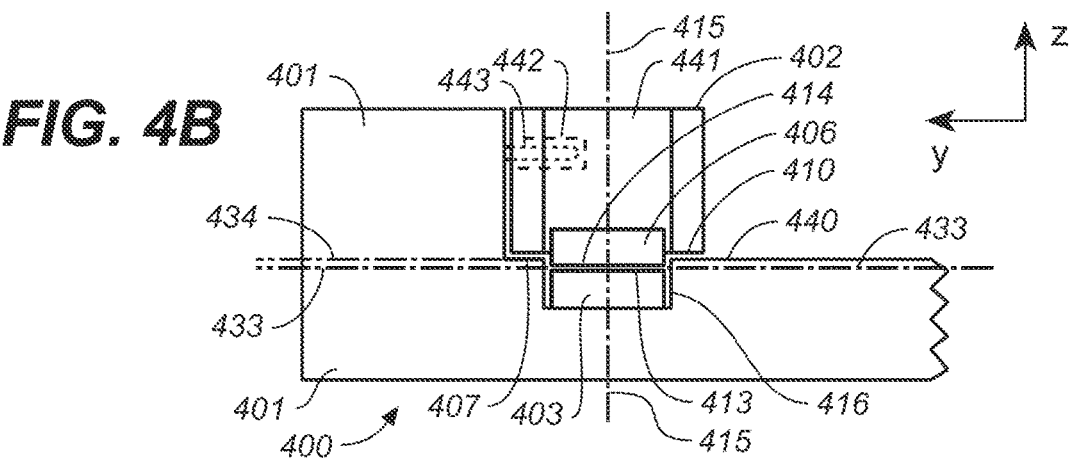
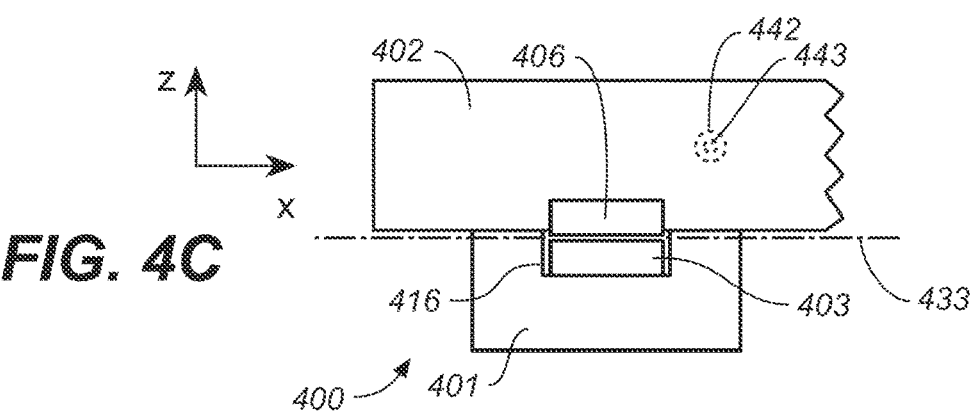

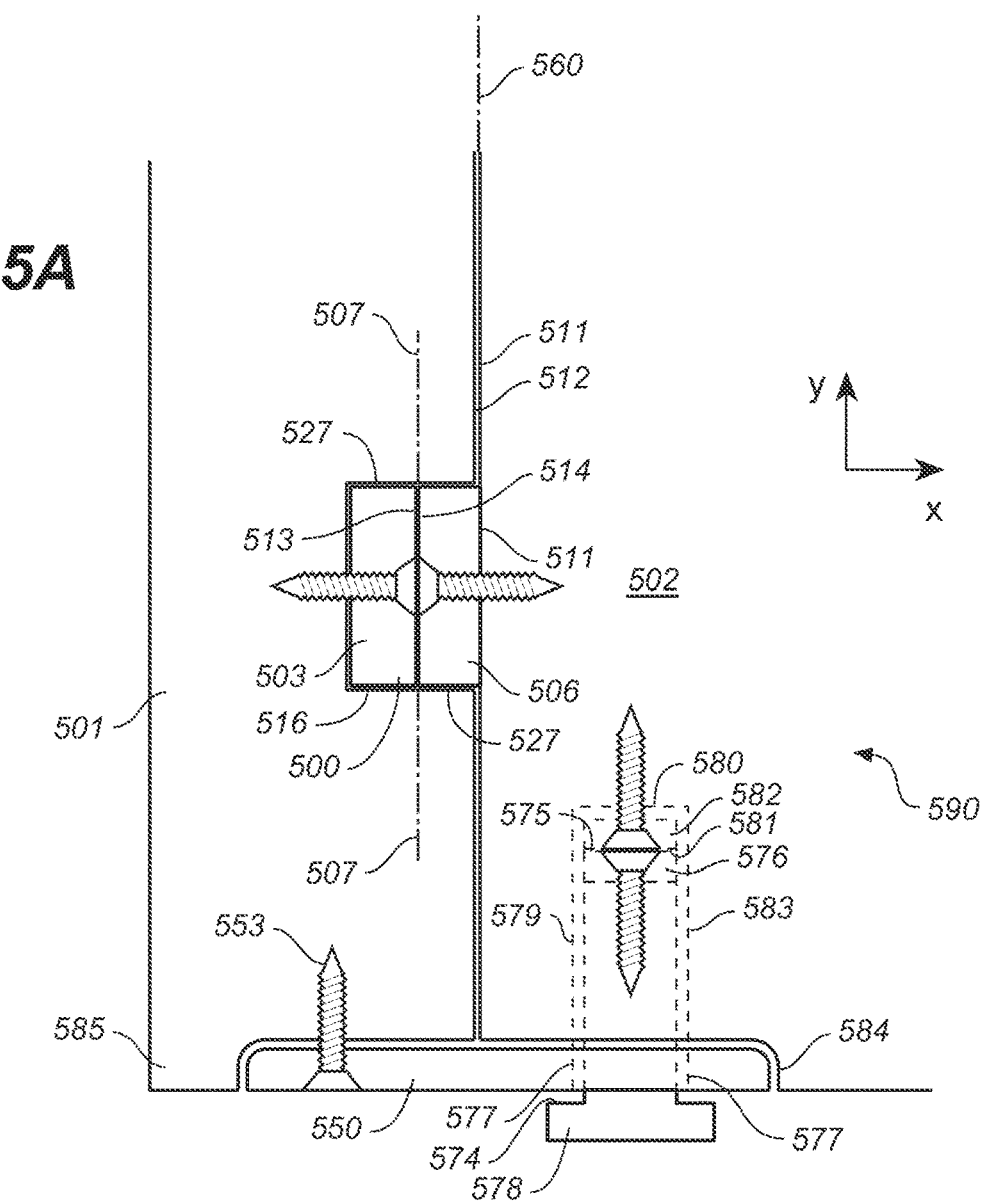
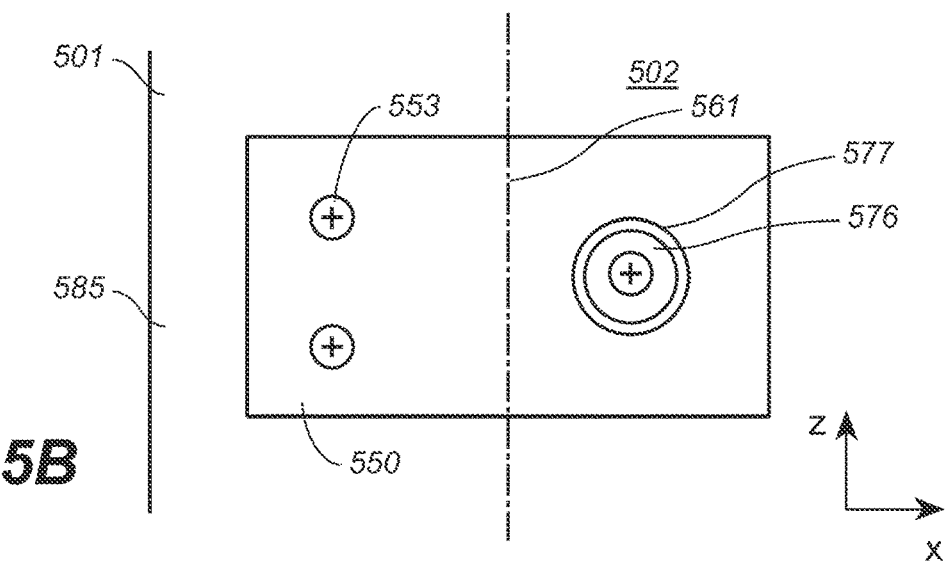

MAGNETIC FASTENERS AND RELATED ARTICLES AND METHODS

CROSS-REFERENCE TO RELATED APPLICATIONS

This application claims priority to U.S. Provisional Patent Application No. 62/021,869, titled "Method of Making and Using Magnetic Fasteners For Article of Use" and filed on Jul. 8, 2014, which is hereby incorporated by reference herein in its entirety for all purposes.

FIELD

This invention generally relates to magnetic fasteners and to applications utilizing the magnetic fasteners, in particular for the assembly of furniture and cabinetry.

BACKGROUND

Furniture and cabinetry are often assembled using screws, nails, bolts and/or fasteners such as cam fasteners. The screws, nails, bolts, and cam fasteners are susceptible to becoming lost even though they are frequently packaged separately. The assembly requires tools, and in some cases, specialized tools. Unskilled users may also mistake one part for another even if instructions are provided, and difficulties in assembly and/or reduced mechanical integrity of the assembled product may result. An unskilled user may misuse tools and strip screw heads, strip screw holes, strip cam fasteners, bend nails, split wood or particle board pieces, and the like. It is often desired to take apart furniture and cabinetry for moving and/or storing for future use. However, repeatedly taking apart and reassembling furniture that is assembled using screws, nails, bolts, or cam fasteners may not be possible or may take significant time, requires tools, may require instructions, and often results in damage to the furniture. There exists a need for fasteners for use in furniture and cabinetry that require limited use of tools, limited instructions, limited user skill, and that may accommodate repeated disassembly and assembly.

SUMMARY

Described herein are magnetic fasteners and magnetic joints that may be used to reversibly join two or more objects in a manner that may not require tools. The fasteners and joints described herein result in consistently assembled joints independent of user skill, and as a result structures that have consistent and predictable constructions can be formed. The magnetic joints and fasteners are stable and secure in the x-, y- and z-directions. The magnetic fasteners and joints may be used to reversibly assemble many different types of two-dimensional or three-dimensional structures, for example to assemble components of a piece of furniture or to assemble components of cabinetry. The magnetic fasteners may be used to join two or more members made of a variety of materials. In some cases, the members joined using the magnetic fasteners and joints may be made from stiff or rigid materials, or from materials that are stiff or rigid in at least two dimensions. In some cases, the members are made of wood, particle board, plastic, composites, glass, ceramic, non-magnetic metals such as aluminum, carbon fiber materials, fiberglass, laminates, Masonite, press board, waferboard, composites, plastic, glass, ceramic, reconstituted or recycled wood products, reconstituted or recycled plastic products, non-magnetic metal such as aluminum, or any combination of two or more of the foregoing. Non-limiting examples of laminates that may be used include veneered laminates (e.g., wood-veneered laminates), plastic laminates (e.g., Formica® laminates), hollow core laminates, laminates with corrugated cores, and waferboard laminates. Non-limiting examples of materials that are stiff or rigid in two dimensions but can be flexed (e.g., rolled up) in the third dimension include carbon fiber sheet, fiberglass sheet, thick plastic sheet, laminates, and thin non-magnetic metal sheets. The magnetic fasteners and magnetic joints described herein may be used to join members that are made from the same materials, or members that are made from different materials. Because the joints formed using the magnetic fasteners and joints are reversibly assembled, articles made using the magnetic fasteners may be disassembled and reassembled as many times as desired. In some cases, the fasteners and joints may be used in articles that are reconfigurable, where one or more substitute or optional components may be included at the user's discretion. The cabinetry, furniture and other articles made using the magnetic fasteners and joints as described herein may be useful in situations that require furnishing to be frequently disassembled, reassembled, reconfigured and/or stored, such as in a corporate setting to make cubicles, partitions, carts, desks, worktables, chairs, shelves, cabinets and the like, or in an institutional setting such as a school, hospital, rehabilitation center, and the like. In some cases, the magnetic fasteners and joints may be fixed in place after a structure is assembled so that the structure is permanently assembled. Non-limiting examples of structures that can be made using the magnetic fasteners and joints include desks, worktables, partitions, carts, shelving units, chests, dressers, chairs, bed frames, lofts, dormitory beds, hospital beds, bathroom vanities, kitchen cabinets, frames for pictures, mirrors and the like, free-standing cabinets, wall-mounted cabinets and the like.

In one aspect, described herein are magnetic fasteners. The fasteners comprise a first magnet secured to a first member, and a second component that is magnetically attracted to the first magnet secured to a second member. The first and second members may be rigid or stiff, or rigid or stiff in at least two dimensions. The joints comprise a first planar magnetic junction between the first magnet and the second component, and a second junction between mating surfaces of the first and second members. The planar magnetic junction and the junction between the mating surfaces of the first and second members are offset relative to each other. In some variations, the second junction between mating surfaces of the first and second members is parallel to and offset relative to the planar magnetic junction. Optionally, the second component is or comprises a magnet. If the second component is or comprises a magnet, it may be magnetized axial to its planar face. Optionally, the magnet fasteners comprise a coupling device that restricts movement between the first and second members in an axial direction that is perpendicular to the planar magnetic junction.

In some variations of the magnetic fasteners, the first magnet comprises a planar face and a mounting surface opposing its planar face, and the first magnet is magnetized axial to its planar face, and the second component comprises a planar face and a mounting surface opposing its planar face. The circumferential shapes and circumferential dimensions of the first magnet and second component are substantially the same. One of the first magnet and the second component is secured to the first member so that its planar face protrudes from the mating surface of the first member.

The other of the first magnet and second component is secured in a recess in the mating surface of the second member with its mounting surface directed inward toward a base of the recess and its planar face remaining within the recess and facing outward from the recess. The recess has a circumferential shape and circumferential dimension corresponding to that of the first magnet and second component so that the first magnet and second component may be axially positioned within the recess but not move substantially in a non-axial direction. In operation, magnetic attraction between the first magnet and the second component draws the first magnet and second component together to form a planar magnetic junction within the recess and draws the first member's mating surface into contact with the second member's mating surface. The magnetic junction within the recess is offset from a junction between mating surfaces of the first and second members. The magnetic attraction between the first magnet and second component provides an axial force joining the first and second members. In addition, the joined first magnet and second component provide lateral support to the joint between the first and second members by forming a plug within the recess that resists shear forces along the mating surfaces between the first and second members since the planar magnetic junction between the first magnet and the second component is offset from junction between mating surfaces of the first and second members.

The first magnet and second component may be selected to be attracted to each other with sufficient force to provide the joint with the desired strength, in particular in the axial direction. The second component may be any component that is magnetically attracted to the first magnet. In some variations, the second component is or comprises another magnet, with its pole oriented such that it is attracted to the first magnet in the desired orientation. In some variations, the second component comprises a ferromagnetic material, with non-limiting examples of ferromagnetic materials including iron, nickel, cobalt and alloys and combinations thereof, and ferromagnetic materials comprising rare earth elements. If the second component is or comprises a magnet, it may be magnetized axial to its planar face.

In some variations of the magnetic fasteners, the mounting surface of the first magnet or the second component is planar and parallel to its planar face, and its planar mounting surface is secured to the mating surface of the first member. In some variations, the first magnet or the second component is secured in a recess in the mating surface of the first member, and a depth of the recess is selected so that the planar face of the first magnet or second component protrudes from the recess.

In some variations, each of the first magnet and second component have planar and parallel opposing faces and are disk-shaped, with a circular circumferential shape. In some variations, each of the first and second magnets has planar and parallel opposing faces and has a square circumferential shape. In some variations, each of the first and second magnets has planar and parallel opposing faces and has an oval or elliptical circumferential shape.

The first magnet and second component may be secured to the members using any securing means. The first magnet and second component are secured such that their planar faces remain available to make a planar magnetic junction with each other. In some cases, at least one of the first magnet and second component comprises a countersink or a counter bore configured to receive a screw for securing the first magnet or second component to its respective member. In some cases, both the first magnet and the second component comprise countersinks or counter bores configured for receiving screws for securing to their respective members. In some case, one or both of the first magnet and second component is secured to its respective member using an adhesive. In some cases, a first magnet or a second component may be friction fit or press fit into a recess.

Any suitable magnet may be used in the joints. In some cases, a magnet is a disk-shaped magnet. In some cases, a magnet is a rare earth magnet. For example, a magnet may be a neodymium-containing rare earth magnet. If the second component is or comprises a magnet, both magnets may be disk-shaped. If the second component is or comprises a magnet, both magnets may be rare earth magnets, for example neodymium-containing rare earth magnets. In some cases, the second component is or comprises a magnet, and both magnets are disk-shaped neodymium-containing rare earth magnets. In some variations, a pull force of a magnet used is at least about 0.3 lb., at least about 0.5 lb., at least about 1 lb., at least about 2 lbs., at least about 3 lbs., at least about 4 lbs., at least about 5 lbs., at least about 6 lbs., at least about 7 lbs., at least about 8 lbs., at least about 9 lbs., or at least about 10 lbs.

Magnetic fasteners may be configured for joining together planar or non-planar mating surfaces. In some variations, the magnetic fastener is configured for abutting a planar mating surface of the first member to a planar mating surface of the second member. In some variations, the magnetic fastener is configured for joining mating surfaces of the first and second members to form a non-planar junction.

In some cases, a magnetic fastener may be fixed after assembly, e.g., using a temporary or permanent adhesive. In one example, a packet comprising an adhesive may be disposed on one or both of the planar faces of the first magnet and second component, or disposed on one or both of the mating surfaces of the first and second members, and when the joint is engaged, the packet releases adhesive to adhere the planar faces or mating surfaces.

An article may be at least partially assembled using at least one of the magnetic fasteners. Non-limiting examples of articles include cubicles, partitions, carts, tables, chairs, bed frames, lofts, frames for pictures, posters and mirrors and the like, desks, dressers, chests, shelving units, vanities, free-standing cabinets, wall-mounted cabinets, and kitchen cabinets.

In another aspect, a magnetic joint comprises a first member, a first magnet having a planar face, a second component that is magnetically attracted to the first magnet, has a planar face and is secured to a second member, and a coupling device. The first and second members may be rigid or stiff, or rigid or stiff in at least two dimensions. The first magnet and the second component have substantially the same circumferential shapes and circumferential dimensions. The first magnet may be axially magnetized relative to its planar face. The first member comprises a through-hole perpendicular to its mating surface. The through-hole has a circumferential shape and circumferential dimension corresponding to that of the first magnet and second component so that the first magnet and second component may be axially positioned within the through-hole but not move substantially in a non-axial direction. One of the first magnet and second component is secured within a recess in the mating surface of the second member with its planar face being within the recess and facing outward. The recess has a circumferential shape and circumferential dimension corresponding to that of the first magnet and second component so that the first magnet and second component may be axially positioned within the recess but not move substantially in a non-axial direction. When the joint is engaged, mating surfaces of the first and second members are in contact and the through-hole in the first member is aligned with the recess in the second member to form a continuous bore, and the coupling device is engaged to restrict movement between the first and second members in an axial direction along a depth of the bore. The other of the first magnet and second component is inserted into the through-hole with its planar face directed toward the second magnet. The secured first magnet or second component within the recess draws the other of the first magnet and second component into the recess so it is axially positioned partially within the recess and partially within the through-hole. The planar faces of the magnets form a planar magnetic junction that is positioned within the recess and is offset from a junction between mating surfaces of the first and second members. The coupling device provides an axial support joining the first and second members. The joined magnets within the bore provide lateral support to the joint between the first and second members by forming a plug within the bore that resists shear forces along the mating surfaces between the first and second members since the planar magnetic junction between the magnets is offset from a junction between mating surfaces of the first and second members.

In some variations, each of the first magnet and second component have planar and parallel opposing faces and are disk-shaped, with a circular circumferential shape. In some variations, each of the first and second magnets has planar and parallel opposing faces and has a square circumferential shape. In some variations, each of the first and second magnets has planar and parallel opposing faces and has an oval or elliptical circumferential shape.

The first magnet or second component may be secured in the recess of the second member using any suitable securing means or method. The first magnet or second component is secured within the recess such that its planar face remains available to make a planar magnetic junction with that of the other of the first magnet and second component. In some cases, the first magnet or second component comprises a countersink or a counter bore configured to receive a screw for securing the first magnet or second component to its respective member. In some case, the first magnet or second component is secured in the recess using an adhesive. In some cases, a first magnet or a second component may be friction fit or press fit into a recess.

The first magnet and second component may be selected to be magnetically attracted to each other with sufficient force to provide the joint with the desired strength, in particular in the axial direction. The second component may be any component attracted to the first magnet. In some variations, the second component is another magnet, with its pole oriented such that it is attracted to the first magnet in the desired orientation. In some variations, the second component comprises a ferromagnetic material, with non-limiting examples of ferromagnetic materials including iron, nickel, cobalt, and alloys and combinations thereof, and ferromagnetic materials comprising rare earth elements. If the second component is or comprises a magnet, it may be magnetized axial to its planar face.

Any suitable magnet may be used in the joints. In some cases, a magnet is a disk-shaped magnet. In some cases, a magnet is a rare earth magnet. For example, a magnet may be a neodymium-containing rare earth magnet. If the second component is or comprises a magnet, both magnets may be disk-shaped. If the second component is or comprises a magnet, both magnets may be rare earth magnets, for example neodymium-containing rare earth magnets. In some cases, the second component is or comprises a magnet, and both magnets are disk-shaped neodymium-containing rare earth magnets. In some variations, a pull force of a magnet used is at least about 0.3 lb., at least about 0.5 lb., at least about 1 lb., at least about 2 lbs., at least about 3 lbs., at least about 4 lbs., at least about 5 lbs., at least about 6 lbs., at least about 7 lbs., at least about 8 lbs., at least about 9 lbs., or at least about 10 lbs.

The coupling device used in the joints can be any suitable device or mechanism joining together the first and second members. For example, the coupling device may comprise a) a pin in one of the first and second members and a recess configured to receive the pin in the other of the first and second members; b) a groove in one of the first and second members configured to receives the other of the first and second members; c) a butterfly connector that connects the first and second members; d) a plate coupled to one of the first and second members, and a foot or cotter pin extending through the plate and into the other of the first and second members; or e) a bracket (e.g., an L-shaped bracket) that is coupled to the first and second members.

The magnetic joints may be configured for joining together planar or non-planar mating surfaces. In some variations, the magnetic joint is configured for abutting a planar mating surface of the first member to a planar mating surface of the second member. In some variations, the magnetic joint is configured for joining together mating surfaces so that a non-planar junction results.

In some cases, a magnetic joint may be fixed after assembly, e.g., using a temporary or permanent adhesive. In one example, a packet comprising an adhesive may be disposed on one of the planar faces of the first magnet and second component, or disposed on one of the mating surfaces of the first and second members, and when the joint is engaged, the packet releases adhesive to adhere the planar faces or mating surfaces.

An article may be at least partially assembled using at least one of the magnetic joints. Non-limiting examples of articles include cubicles, partitions, carts, tables, chairs, bed frames, lofts, frames for pictures, posters and mirrors and the like, desks, dressers, chests, shelving units, vanities, free-standing cabinets, wall-mounted cabinets, and kitchen cabinets.

Another variation of a magnetic fastener for joining two members is provided. The fastener comprises a first magnet that has a planar face and is secured to a first member, a second component that is magnetically attracted to the first magnet, has a planar face, and is secured to a second member, and a coupling device. The first and second members may be rigid or stiff, or rigid or stiff in at least two dimensions. The first magnet may be axially magnetized relative to its planar face. The first magnet is secured in a recess of the first member so that the planar face of the first magnet is flush with a planar mating surface of the first member. The second component is secured in a recess of the second member so that the planar face of the second component is flush with a planar mating surface of the second member. In operation, the planar faces of the first magnet and second component form a planar magnetic junction in a same plane as a junction between the mating surfaces of the first and second members. The coupling device restricts lateral motion between the first and second members along the planar magnetic junction. In some variations, the second component is or comprises a magnet. For these variations of magnetic fasteners, the first magnet and second component may or may not have the same circumferential shape and circumferential dimensions.

In some variations, one or both of the first magnet and second component have planar and parallel opposing faces and are disk-shaped, with a circular circumferential shape. In some variations, one or both of the first and second magnets has planar and parallel opposing faces and has a square circumferential shape. In some variations, one or both of the first and second magnets has planar and parallel opposing faces and has an oval or elliptical circumferential shape.

The first magnet and second component may be secured in the recesses of the first and second members using any suitable securing means or method. The first magnet and second component are secured within their recesses such that their planar faces remains available to make a planar magnetic junction with that of the other of the first magnet and second component. In some cases, the first magnet and/or second component comprises a countersink or a counter bore configured to receive a screw for securing the first magnet or second component to its respective member. In some case, the first magnet and/or second component is secured in the recess using an adhesive. In some cases, a first magnet and/or a second component may be friction fit or press fit into a recess.

The first magnet and second component may be selected to be magnetically attracted to each other with sufficient force to provide the joint with the desired strength, in particular in the axial direction. The second component may be any component attracted to the first magnet. In some variations, the second component is or comprises another magnet, with its pole oriented such that it is attracted to the first magnet in the desired orientation. In some variations, the second component comprises a ferromagnetic material, with non-limiting examples of ferromagnetic materials including iron, nickel, cobalt, and alloys and combinations thereof, and ferromagnetic materials comprising rare earth elements. If the second component is or comprises a magnet, it may be magnetized axial to its planar face.

Any suitable magnet may be used in the fasteners. In some cases, a magnet is a disk-shaped magnet. In some cases, a magnet is a rare earth magnet. For example, a magnet may be a neodymium-containing rare earth magnet. If the second component is or comprises a magnet, both magnets may be disk-shaped. If the second component is or comprises a magnet, both magnets may be rare earth magnets, for example neodymium-containing rare earth magnets. In some cases, the second component is or comprises a magnet, and both magnets are disk-shaped neodymium-containing rare earth magnets. In some variations, a pull force of a magnet used is at least about 0.3 lb., at least about 0.5 lb., at least about 1 lb., at least about 2 lbs., at least about 3 lbs., at least about 4 lbs., at least about 5 lbs., at least about 6 lbs., at least about 7 lbs., at least about 8 lbs., at least about 9 lbs., or at least about 10 lbs.

The coupling devices used in the fasteners can be any suitable device or mechanism joining together the first and second members. For example, the coupling device may comprise a) a pin in one of the first and second members and a recess configured to receive the pin in the other of the first and second members; b) a groove in one of the first and second members configured to receives the other of the first and second members; c) a butterfly connector that connects the first and second members; d) a plate coupled to one of the first and second members, and a foot or cotter pin extending through the plate and into the other of the first and second members; or e) a bracket (e.g., an L-shaped bracket) that is coupled to the first and second members. In some cases, a coupling device may be non-planar mating features on the first and second members.

The magnetic fasteners may be configured for joining together planar or non-planar mating surfaces. In some variations, the magnetic fastener is configured for abutting a planar mating surface of the first member to a planar mating surface of the second member. In some variations, a magnetic fastener is configured to joint mating surfaces of the first and second members to result in a non-planar junction.

In some cases, a magnetic fastener may be fixed after assembly, e.g., using a temporary or permanent adhesive. In one example, a packet comprising an adhesive may be disposed on one of the planar faces of the first magnet and second component, or disposed on one of the mating surfaces of the first and second members, and when the joint is engaged, the packet releases adhesive to adhere the planar faces or mating surfaces.

An article may be at least partially assembled using at least one of the magnetic joints. Non-limiting examples of articles include cubicles, partitions, carts, tables, chairs, bed frames, lofts, frames for pictures, posters and mirrors and the like, desks, dressers, chests, shelving units, vanities, freestanding cabinets, wall-mounted cabinets, and kitchen cabinets.

Described herein are methods for making magnetic fasteners. In one aspect, a method comprises securing a first magnet to a first member and securing a second component that is magnetically attracted to the first magnet to a second member, such that when the fastener is engaged, the first magnet and the second component form a first planar magnetic junction, and a mating surface of the first member forms a second junction with a mating surface of the second member, and the first planar magnetic junction is offset from the second junction. In some variations, the junction between the first and second members is planar, and the first and second junctions are parallel to each other and offset relative to each other.

These and other embodiments, features and advantages of the present invention will become more apparent to those skilled in the art when taken with reference to the following more detailed description of the invention in conjunction with the accompanying drawings that are first briefly described.

BRIEF DESCRIPTION OF THE DRAWINGS

FIGS. 4A-4C show another example of a magnetic joint. FIG. 4B is a cross-sectional view along section line A-A', and FIG. 4C is a cross-sectional view along section line B-B'.

FIG. 5A shows another example of a magnetic joint using a magnetic fastener.

FIG. 5B shows a plate for use in the joint.

DETAILED DESCRIPTION

Figure 1A:
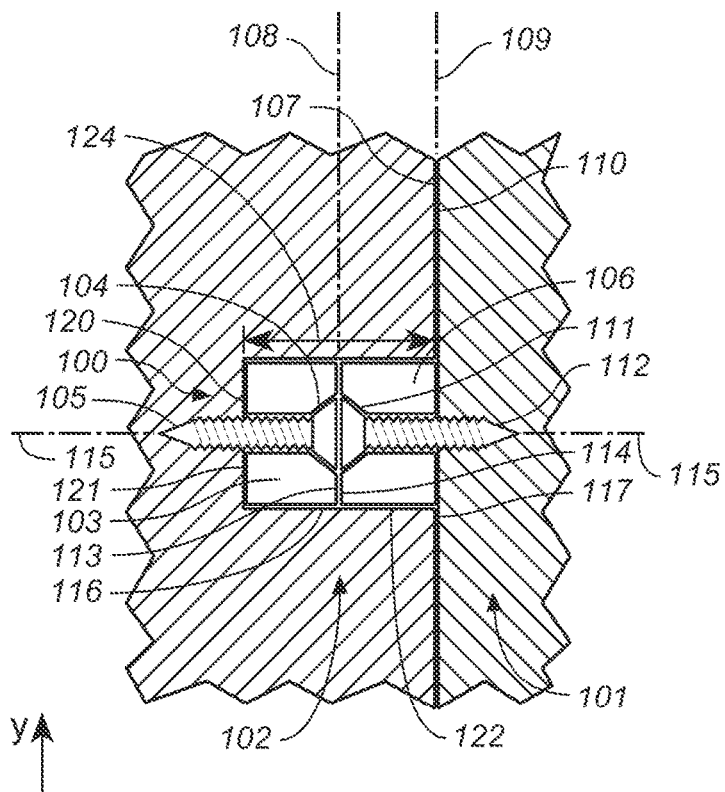
FIGS. 1A-1B show one example of a magnetic fastener.

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention.

As used in this specification and the appended claims, the singular forms "a," "an," and "the" include plural referents unless the context clearly indicates otherwise. Also, the term "parallel" is intended to mean "parallel or substantially parallel" and to encompass minor deviations from parallel geometries rather than to require that any parallel arrangements described herein be exactly parallel. The term "perpendicular" is intended to mean "perpendicular or substantially perpendicular" and to encompass minor deviations from perpendicular geometries rather than to require that any perpendicular arrangement described herein be exactly perpendicular. The term "square" is intended to mean "square or substantially square" and to encompass minor deviations from square shapes, for example substantially square shapes having chamfered (e.g., rounded or otherwise truncated) corners. The term "rectangular" is intended to mean "rectangular or substantially rectangular" and to encompass minor deviations from rectangular shapes, for example substantially rectangular shapes having chamfered (e.g., rounded or otherwise truncated) corners. The term "circular" is intended to mean "circular or substantially circular" and to encompass minor deviations from circular shapes. The term "oval" is intended to mean "oval or substantially oval" and to encompass minor deviations from oval shapes. The term "elliptical" is intended to mean "elliptical or substantially elliptical" and to encompass minor deviations from elliptical shapes. The term "cylindrical" is intended to mean "cylindrical or substantially cylindrical" and to encompass minor deviations from cylindrical shapes. The term "axial" is intended to mean in a direction substantially perpendicular to a planar face of a magnet.

Described herein are magnetic fasteners and magnetic joints that may be used to reversibly join two or more objects in a manner that may not require tools. The magnetic fasteners and joints may be used to reversibly assemble many different types of two-dimensional or three-dimensional structures, for example to assemble components of a piece of furniture or to assemble components of cabinetry. The magnetic joints and fasteners are stable and secure in the x-, y- and z-directions. The magnetic fasteners may be used to join two or more objects made of a variety of materials, such as objects made of wood, particle board, carbon fiber materials, fiberglass, laminates, Masonite, press board, waferboard, composites, plastic, glass, ceramic, reconstituted or recycled wood products, reconstituted or recycled plastic products, non-magnetic metal such as aluminum, or any combination of two or more of the foregoing. Non-limiting examples of laminates that may be used include veneered laminates (e.g., wood-veneered laminates), plastic laminates (e.g., Formica® laminates), hollow core laminates, laminates with corrugated cores, and waferboard laminates. Non-limiting examples of materials that are stiff or rigid in two dimensions but can be flexed (e.g., rolled up) in the third dimension include carbon fiber sheet, fiberglass sheet, thick plastic sheet, laminates, and thin non-magnetic metal sheets. The magnetic fasteners and magnetic joints described herein may be used to join members that are made from the same materials, or members that are made from different materials. The magnetic fasteners and joints may be used to make any suitable joint configuration, e.g., planar joints, non-planar joints, right angle joints, and non-right angle joints. Because the joints formed using the magnetic fasteners and joints are reversibly assembled, articles made using the magnetic fasteners may be disassembled and reassembled as many times as desired. In many cases, the assembly is self-evident so that no user instruction need to be supplied. The fasteners and joints described herein result in consistently assembled joints independent of user skill, and as a result structures that have consistent and predictable constructions can be formed. In some cases, the fasteners and joints may be used in articles that are reconfigurable, where one or more substitute or optional components may be included at the user's discretion. The cabinetry, furniture and other articles made using the magnetic fasteners and joints as described herein may be useful in situations that require furnishing to be frequently disassembled, reassembled, reconfigured and/or stored, such as in a corporate setting to make cubicles, partitions, carts, desks, worktables, chairs, shelves, cabinets and the like, or in an institutional setting such as a school, hospital, rehabilitation center, and the like. In some cases, the fasteners and joints may be fixed in place after a structure is assembled so that the structure is permanently assembled. Non-limiting examples of structures that can be made using the fasteners include desks, worktables, partitions, carts, shelving units, frames for pictures, posters, or mirrors, chests, dressers, chairs, bed frames, lofts, dormitory beds, hospital beds, free-standing cabinets, vanities, kitchen cabinets, wall-mounted cabinets and the like.

Figure 1B:
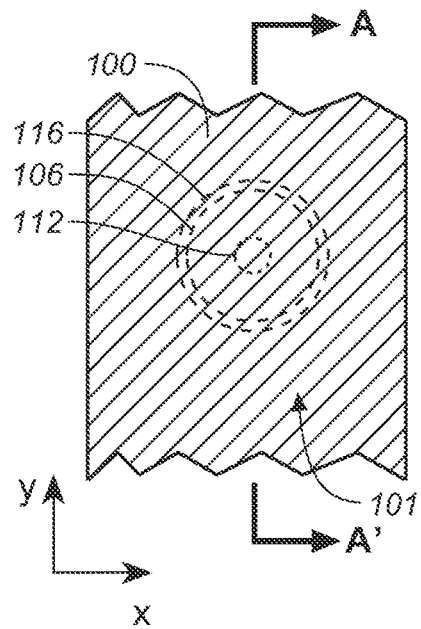

FIGS. 1A-1B and 2A-2B provide non-limiting examples of magnetic fasteners. Referring first to FIGS. 1A-1B, an example of a magnetic fastener 100 is illustrated as it joins a first member 101 to a second member 102. In some cases, the members 101 and 102 are rigid or stiff, or are rigid or stiff in at least two dimensions. In some cases, one of members 101 and 102 may be rigid or stiff in three dimensions, and the other member may be rigid or stiff in two dimensions. FIG. 1B provides a top view from the first member 101 in the x-y plane. FIG. 1A provides a cross-sectional view in the y-z plane along section line A-A'. The magnetic fastener 100 comprises a first magnet 106 and a second component 103 that is magnetically attracted to the first magnet 106. The second component may in some cases be or comprises a second magnet. In some cases, the second component comprises one or more ferromagnetic materials that is magnetically attracted to the first magnet, e.g., the second component may comprise iron, nickel, cobalt, or alloys or combinations thereof, or ferromagnetic materials comprising rare earth elements. For the example illustrated in FIGS. 1A-1B, the first magnet and second component have the same circumferential shape and dimensions. For example, if the first magnet is disk-shaped with a circular circumferential shape, the second component also has a circular circumferential shape of the same radius. The fastener 100 joins members 101 and 102 in three dimensions. Axial magnetic attraction between the first magnet and the second component joins the first and second members to resist relative motion in the z-direction, and the magnetically joined first magnet and second component form a plug within recess 116 that resists motion in the x- and y-dimensions.

Still referring to FIGS. 1A-1B, the first magnet 106 has a planar face 114. The magnet 106 may be axially magnetized relative to its planar face, as indicated by dashed line 115. A mounting surface 117 of magnet 106 is secured to a mating surface 110 of the first member 101. The mounting surface 117 may be a planar surface as illustrated in FIG. 1A, or in some variations the mounting surface 117 of the first magnet is curved, peaked, or otherwise non-planar. The mating surface 110 may be a planar surface as illustrated in FIG. 1A, or in some variations the mating surface 110 of the first member is curved, peaked, or otherwise non-planar. The magnet 106 may be secured to the first member 101 using any available means or method. In some variations, the mounting surface 117 secured to the mating surface 110 using an adhesive. For the particular example shown in FIG. 1A, the magnet 106 has a countersink or counter bore 111 configured for receiving a screw 112 so that the head of the screw does not extend above the planar face 114 of the magnet, and the screw can be driven into the mating surface 110 to secure the first magnet 106 to the surface 110.

Still referring to FIGS. 1A-1B, the second component 103 has a planar face 113. If the second component is or comprises a magnet, it may be axially magnetized, as indicated by dashed line 115. The second component 103 is secured in recess 116 so that its planar face 113 remains within the recess 166 and is directed outward toward the recess opening. If the second component 103 is or comprises a magnet, it is selected so that its pole at planar face 113 is opposite that of the pole at planar face 114 of the first magnet 106, so that magnetic planar faces 113 and 114 are magnetically attracted to each other. The recess 116 can have any suitable shape in which a circumferential shape and circumferential dimension of the recess at the mating surface corresponds to that of the first magnet and second component. At the mating surface, the circumference of the recess is just large enough to receive the first and second magnets in an axial manner, but not so large that the magnets can move substantially in the x- or y-directions. For example, as shown in FIG. 1B, the first magnet 106 and second component 103 are disk-shaped and have circular cross-sections, so that the recess is selected to have a circular cross-section large enough to accommodate the circular cross-section of the disk-shaped first magnet and second component but not large enough to accommodate substantial movement of the first magnet or second component in an x- or y-direction within the recess 116. The second component 103 may be secured in recess 116 using any suitable means or methods. In some cases, a mounting surface 120 of second component 103 that is opposed to planar face 113 is secured to a base 121 of recess 116 using an adhesive. In some cases, second component 103 is adhered around its circumference to side wall 122 of the recess 116 using an adhesive. In some variations, the second component 103 is friction fit or press fit into the recess 116. In some cases, as illustrated in FIG. 1A, second component 103 comprises a countersink or counter bore 104 configured for receiving a screw 105 so that a head of the screw 105 does not extend beyond the planar face 113 of second component 103. The screw 105 is driven into member 102 through surface 121 to secure the second component 103.

Still referring to FIGS. 1A-1B, to form a joint between the first and second members, the first magnet protrudes from the surface 110, and is received into recess 116. The magnetic attraction between the first magnet 106 and second component 103 draws the planar faces 113, 114 together to form a planar magnetic junction, as indicated by dashed line 108. The depth 124 of the recess 116 is selected so that bringing first magnet 106 and second component 106 together (e.g., so that planar faces 113 and 114 are in contact) within the recess 116 also brings mating surface 107 of member 102 into contact with mating surface 110 of member 101. In some variations, mating surfaces 107 and 110 are planar, and in some variations, surfaces 107 and 110 are curved, jagged, peaked, or otherwise non-planar. The junction between the members 101 and 102 as indicated by dashed line 109 is displaced from the planar junction between the first magnet 106 and second component 103, as indicated by the dashed line 108. It should be understood that in some variations, two planar surfaces of members 101 and 102 are joined together so that the junction indicated by dashed line 109 represents a plane, and in other variations, the junction between members 101 and 102 is non-planar.

It should be understood that first magnet and second component may be exchanged in the magnetic fastener illustrated in FIGS. 1A-1B. That is, first magnet 106 may be secured in the recess 116 in the second member 102, the second component 103 may be secured to the surface 110 on the first member 101.

Figure 2A:
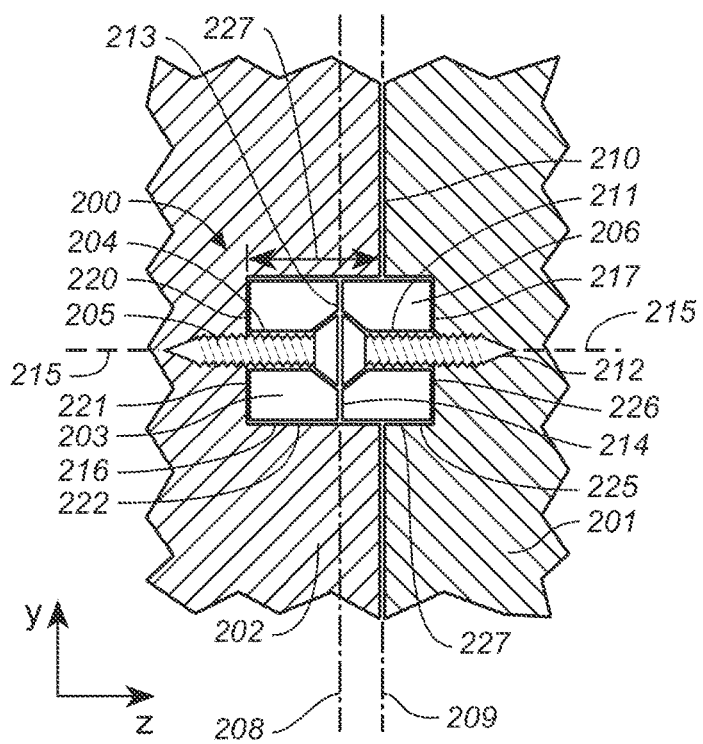
FIGS. 2A-2B shows another example of a magnetic fastener.
Figure 2B:
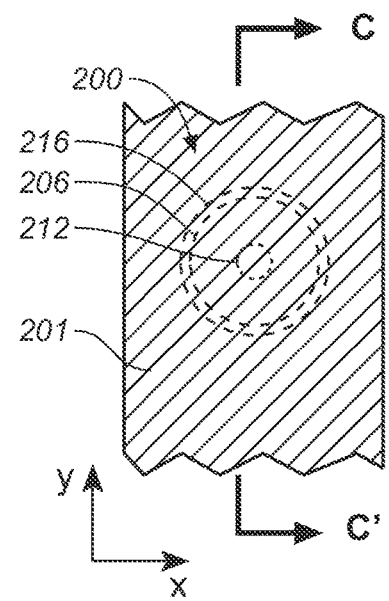

Referring now to FIGS. 2A-2B, another example of a magnetic fastener 200 is illustrated coupling a first member 201 to a second member 202. FIG. 2B provides a top view from the first member 201 in the x-y plane. In some cases, the members 201 and 202 are rigid or stiff, or are rigid or stiff in at least two dimensions. In some cases, one of members 201 and 202 may be rigid or stiff in three dimensions, and the other member may be rigid or stiff in two dimensions. FIG. 2A provides a cross-sectional view in the y-z plane along section line C-C'. The magnetic fastener 200 comprises a first magnet 206 and a second component 203 that is magnetically attracted to the first magnet. The second component may in some cases be or comprise a second magnet. In some cases, the second component comprises one or more ferromagnetic materials that is magnetically attracted to the first magnet, e.g., the second component may comprise iron, nickel, cobalt, or alloys or combinations thereof, or ferromagnetic materials comprising rare earth elements. For the example illustrated in FIGS. 2A-2B, the first magnet and second component have the same circumferential shape and circumferential dimension. For example, if the first magnet is disk-shaped with a circular circumferential shape, the second component also has a circular circumferential shape of the same radius. The fastener 200 joins members 201 and 202 in three dimensions. Axial magnetic attraction between the first magnet and the second component joins the first and second members to resist relative motion in the z-direction, and the magnetically joined first magnet and second component form a plug within recess 216 that resists motion in the x- and y-directions. The first magnet 206 has a planar face 214. The first magnet 206 may have a magnetic field that is axial to its planar face, as indicated by dashed line 215. A mounting surface 217 of magnet 206 is recessed relative to a mating surface 210 of the first member 201. The mounting surface 217 may be a planar surface as illustrated in FIG. 2B, or in some variations the mounting surface 217 of the first magnet is curved, peaked, or otherwise non-planar. The magnet 206 may be secured in the recess 225 using any available means or method. In some variations, the mounting surface 217 is secured to a base 226 of the recess 225 using an adhesive. In some variations, the magnet 206 is adhered to a side wall 227 of the recess 225 using an adhesive. In some variations, the magnet 206 is friction fit or press fit into the recess 225. For the particular example shown in FIGS. 2A-2B, the magnet 206 has countersink or counter bore 211 configured for receiving a screw 212 so that the head of the screw does not extend above the planar face 214 of the magnet 206, and so that the screw can be driven into member 201 through base 226 of the recess 225. As a result, the magnet 206 is secured in recess 225.

Still referring to FIGS. 2A-2B, the second component 203 has a planar face 213. If the second component 203 is or comprises a magnet, it may be magnetized axial to the planar face, as indicated by dashed line 215, and the pole at its planar face 213 may be selected to be opposite that of a pole of the first magnet at its planar face 214. The second component 203 is secured in recess 216 in an axial manner so that its planar face 213 is directed outward toward the opening of the recess. If the second component 203 is a magnet, it may be selected so that its pole at planar face 213 is opposite that of the pole at planar face 214 of the first magnet 206, so that magnetic attraction causes magnetic planar faces 213 and 214 to be attracted to each other. The recess 216 can have any suitable shape, and its circumferential shape and circumferential dimension are selected to be just large enough receive the first magnet and second component in an axial manner, but to resist motion of the magnets in the x- and y-directions. For example, as shown in FIG. 2B, the first magnet 206 and second component 203 are disk-shaped and have circular cross-sections, so that the recess is selected to have a circular cross-section just large enough to accommodate the circular cross-section of the disk-shaped magnets, but not large enough to accommodate substantial movement of the magnets in an x- or y-direction within the recess 216. The second component 203 may be secured in recess 216 using any suitable means or methods. In some cases, a mounting surface 220 of magnet 203 that is opposed to planar face 213 is secured to a base 221 of recess 216 using an adhesive. In some cases, the second component 203 is adhered around its circumference to side wall 222 of the recess 216 using an adhesive. In some variations, the second component 203 is friction fit or press fit into the recess 216. In some cases, as illustrated in FIG. 2A, second component 203 contains a countersink or counter bore 204 configured for receiving a screw 205 so that a head of the screw 205 remains flush with or lower than planar face 213 of second component 203. The screw 205 is driven into member 202 through base 221 to secure the second component within the recess 216.

Still referring to FIGS. 2A-2B, to form a joint between the first and second members, the planar face 214 of the first magnet 206 protrudes from the mating surface 210, and is received into recess 216. The magnetic attraction between the first magnets 206 and second component 203 draws the planar faces 213, 214 together to form a planar magnetic junction, as indicated by dashed line 208. The depth 227 of the recess 216 can be selected so that bringing first 206 and second component 203 together (e.g., so that planar faces 213 and 214 are in contact) within the recess 216 also brings mating surface 207 of member 202 into contact with mating surface 210 of member 201. The junction between the members 201 and 202 as indicated by dashed line 209 is displaced from the planar junction between the first magnet 206 and second component 203, as indicated by the dashed line 208. It should be understood that in some variations, two planar surfaces of members 201 and 202 are joined together so that the junction indicated by dashed line 109 represents a plane, and in other variations, a junction between members 201 and 202 is non-planar.

It should be understood that first magnet and second component may be exchanged in the magnetic fastener 200 illustrated in FIGS. 2A-2B. That is, first magnet 206 may be secured in the recess 216 in the second member 202, and the second component 203 may be secured in the recess 225 in the first member 201.

In one aspect, the fasteners as illustrated in FIGS. 1A-1B and FIGS. 2A-2B comprise a first magnet secured to a first member, and a second component that is magnetically attracted to the first magnet secured to a second member. In some cases, the first and second members are rigid or stiff materials, are rigid or stiff in at least two dimensions. In some cases, one of the first and second members rigid or stiff in three dimensions and the other of the first and second member is rigid or stiff in two dimensions. The fasteners comprise a first planar magnetic junction between the first magnet and the second component, and a second junction between mating surfaces of the first and second members. The planar magnetic junction and the junction between the mating surfaces of the first and second members are offset relative to each other. In some variations, the second junction between mating surfaces of the first and second members is planar and is parallel to and offset relative to the planar magnetic junction. Optionally, the second component is or comprises a magnet. If the second component is or comprises a magnet, it may be magnetized axial to its planar face. Optionally, the magnet joints comprise a coupling device that restricts movement between the first and second members in an axial direction that is perpendicular to the planar magnetic junction.

Figure 3A:
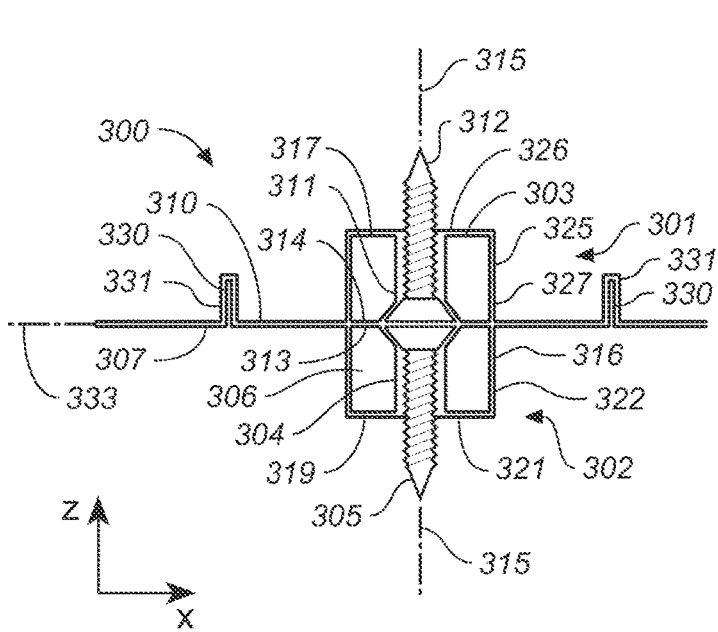
FIGS. 3A-3B shows an example of a magnetic joint.
Figure 3B:
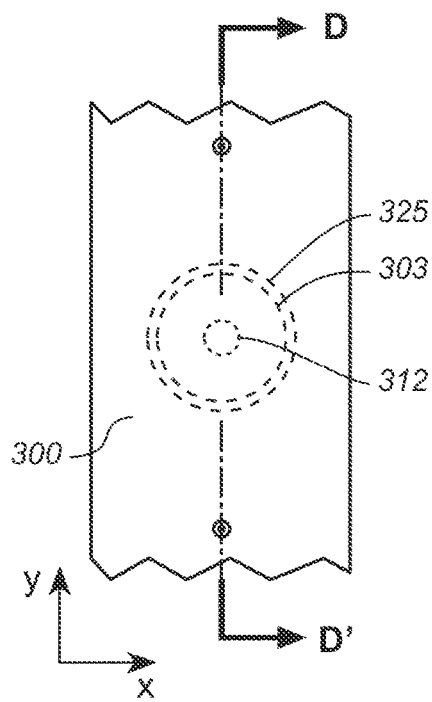

FIGS. 3A-3B illustrate another example of a magnetic fastener. FIG. 3B provides a top view in the x-y plane, and FIG. 3A provides a cross-sectional view in the y-z plane, along section line D-D'. A first magnet 303 is secured to the first member 301, and a second component 306 that is magnetically attracted to the first magnet is secured to the second member 302. In some cases, the members 301 and 302 are rigid or stiff, or are rigid or stiff in at least two dimensions. In some cases, one of members 301 and 302 may be rigid or stiff in three dimensions, and the other member may be rigid or stiff in two dimensions. In some variations, the second component may be a magnet. The second component may in some cases be or comprises a second magnet. In some cases, the second component comprises one or more ferromagnetic materials that is magnetically attracted to the first magnet, e.g., the second component may comprise iron, nickel, cobalt, or alloys or combinations thereof, or ferromagnetic materials comprising rare earth elements. For the example illustrated in FIGS. 3A-3B, the first magnet and second component may or may not have the same circumferential shape and circumferential dimension. In some cases, the first magnet and second component do have the same circumferential shape and circumferential dimension. For example, if the first magnet is disk-shaped with a circular circumferential shape, the second component also has a circular circumferential shape of the same radius. The fastener 300 joins members 301 and 302 in three dimensions. Axial magnetic attraction between the first magnet and the second component joins the first and second members to resist relative motion in the z-direction, and a coupling device resists motion in the x- and y-dimensions. The first magnet 303 has a planar face 314. The first magnet 303 may be axially magnetized relative to its planar face, as indicated by dashed line 315. Magnet 303 has a mounting surface 317 opposite its planar face 314. The mounting surface 317 may be a planar surface as illustrated in FIGS. 3A-3B, or in some variations the mounting surface 317 of the first magnet is curved, peaked, or otherwise non-planar. First magnet 303 is secured in recess 325 so that its planar face 314 is flush with a mating surface 310 of first member 301. Magnet 303 may be fixed in the recess 325 using any available means or method. In some variations, the mounting surface 317 of magnet 303 is secured to a base 326 of the recess 325 using an adhesive. In some variations, the first magnet 303 is adhered to a side wall 327 of the recess 325 using an adhesive. In some variations, the first magnet 303 is friction fit or press fit into the recess 325. For the particular example shown in FIGS. 3A-3B, the magnet 303 has a countersink or counter bore 311 configured for receiving a screw 312 so that the head of the screw does not extend above the planar face 314 of the magnet 303, and so that the screw can be driven into member 301 through base 326 of the recess 325. As a result, the magnet 303 is secured in recess 325.

Still referring to FIGS. 3A-3B, the second component 306 has a planar face 313. If the second component is or comprises a magnet, it may be magnetized axial to its planar face, as indicated by dashed line 315, and a pole at its planar face 313 may be selected to be opposite that of the first magnet's planar face 314. The second component 306 has a mounting surface 319 opposite its planar face 313. The mounting surface 319 may be a planar surface as illustrated in FIG. 3A, or in some variations the mounting surface 319 of the first magnet is curved, peaked, or otherwise non-planar. The second component 306 is secured in recess 316 in the second member 302 such that its planar face 313 is flush with mating surface 307 of second member 302. The second component 306 may be secured in the recess 316 using any available means or method. In some variations, the mounting surface 319 of second component 306 is secured to a base 321 of the recess 316 using an adhesive. In some variations, the second component 306 is adhered to a side wall 322 of the recess 316 using an adhesive. In some variations, the second component 306 is friction fit or press fit into recess 316. For the particular example shown in FIGS. 3A-3B, the second component 306 has a countersink or counter bore 304 configured for receiving a screw 305 so that the head of the screw does not extend above the planar face 313 of the second component 306, and so that the screw can be driven into member 302 through bottom surface 320 of the recess 316. As a result, the magnet 306 is secured in recess 316.

Still referring to FIGS. 3A-3B, the magnetic fastener optionally includes one or more coupling devices that resists motion between the first and second members in the x- and y-directions. The magnetic attraction between first magnet 303 and the second component 306 resists relative motion of the first and second members in the z-direction, and the magnetic attraction also provides some resistance to motion in the x- and y-directions. To provide additional resistance to motion between the first and second members in the x- and y-directions, one or more coupling devices may be included in the fastener. Any type of coupling devices that stabilizes a planar junction in one or both of the x- and y-directions may be used. Non-limiting examples of coupling devices include pins or dowels 330 that are received by recesses 331 as illustrated in FIGS. 3A-3B, clamps, butterfly connectors, cotter pins, dovetails, lips, brackets (e.g., an L-shaped bracket), and the like. In some cases, the planar faces 313 and 314 comprise a rubbery or non-slip surface, or a rough surface to resists sliding along the planar magnetic junction.

Still referring to FIGS. 3A-3B, to form a joint between the first and second members, the magnetic attraction between the first magnet 303 and second component 306 draws the planar faces 313, 314 together to form a planar magnetic junction, as indicated by dashed line 333. The pins or other stabilizing devices are employed to stabilize the magnetic junction in the x- and y-directions so that it is less susceptible to shear force at the planar magnetic junction. In some cases, the planar faces 313 and 314 comprise a rubber non-slip surface, or a rough surface to resists sliding along the planar magnetic junction. In some variations, mating surfaces 307 and 310 are planar, and in some variations, surfaces 307 and 310 are curved, jagged, peaked, or otherwise non-planar. When the magnetic fastener is engaged, the planar faces 314 and 313 are contacted to form a planar magnetic junction as illustrated by dashed line 333, and mating surfaces 307 and 310 of the first and second members are brought together. In some cases, the mating surfaces 307 and 310 are planar, so that a junction between the mating surfaces 307 and 310 is coplanar with the magnetic junction between planar faces 314 and 313. In some cases, the mating surfaces 307 and 310 incorporate non-planar features that mate together and resist motion in the x- and/or y-directions.

It should be understood that first magnet and second component may be exchanged in the magnetic fastener 300 illustrated in FIGS. 3A-3B. That is, first magnet 303 may be secured in the recess 316 in the second member 302, and the second component 306 may be secured in the recess 325 in the first member 301.

FIGS. 4A-4C provide an illustration of an example of a magnetic joint. FIG. 4A provides a top view in the x-y plane of a magnetic joint 400, FIG. 4B provides a cross-sectional view in the y-z plane along section line E-E', and FIG. 4C provides a cross-sectional view in the x-z plane along section line F-F'. The magnetic joint 400 joins together first and second members 401 and 402, and comprises a first magnet 403 having a planar face 413 and a second component 406 that is magnetically attracted to the first magnet and has a planar face 414. In some cases, the members 401 and 402 are rigid or stiff, or are rigid or stiff in at least two dimensions. In some cases, one of members 101 and 102 may be rigid or stiff in three dimensions, and the other member may be rigid or stiff in two dimensions. The second component may in some cases be or comprise a second magnet. In some cases, the second component comprises one or more ferromagnetic materials that is magnetically attracted to the first magnet, e.g., the second component may comprise iron, nickel, cobalt, or alloys or combinations thereof, or ferromagnetic materials comprising rare earth elements. In this particular example, the first magnet 403 is secured in a recess 416 in the first member 401. The first magnet has a planar face 413 and may be axially magnetized relative to its planar face, as indicated by dashed line 415. The first magnet 403 is secured in the recess 416 so that its planar 413 face faces the opening of the recess. The first magnet is secured in such a way that its planar face 413 is available to form a planar junction with a planar face of the second magnet. The planar face 413 is disposed in the recess 416 below a top surface 440. Attached to member 401 is a pin 443 extending in a direction that resists displacement of the members 401 and 402 in the axial direction (z-direction). In this variation, the second member 402 has a through-hole 441 and a mating hole 442 configured to receive pin 443. The circumference of through-hole 441 is sized and shaped to mate with and form a continuous barrel with recess 416 when a mating surface 407 of first member 401 is abutted against mating surface 410 of second member 402, and the through-hole 441 is aligned with recess 416. Optionally, member 402 may comprise one or more mating features such as slots or grooves configured to receive member 401 and align the through-hole 441 with the recess 416. Optionally, member 401 may comprise one or more mating features such as slots or grooves configured to receive member 402 and align the through-hole 441 with the recess 416. If the second component is a magnet, it may be selected so that its planar face 414 is of the opposite pole to that of the planar face 413 of magnet 403. The pin 443 is inserted into the recess 442 and the through-hole 441 is aligned with the recess 416 to form a continuous barrel. After the barrel between the first and second members is formed, the second component 406 is positioned axially (as indicated by dashed line 415) in the through-hole with its planar face 414 facing into the barrel. The magnetic attraction between the first magnet and the second component draws the second component into the barrel so that it is positioned partially within the recess 416 and partially within the through-hole 441 to form a planar magnetic junction within recess 416, indicated by dashed line 433. As illustrated in FIGS. 4B-4C, the planar magnetic junction 433 is offset from a junction 434 between the first and second members. The magnetically joined first magnet and the second component form a plug in the barrel formed by recess 416 and through-hole 441, and the planar junction between the magnets is protected from shear force in the x- and y-directions by the side walls of the recess 416. The mating pin 443 and recess 442 constrain the second member 402 from displacing from the first member 401 in the z-direction, and the first magnet and second component in the recess 416 constrain the second member from displacing from the first member in the x- and y-directions. To disassemble the joint 400, another permanent magnet may be used to extract the second component 406 out through the through-hole 441. It should be understood that any suitable coupling device that restricts relative motion between the first and second members may be used in place of the mating pin and recess illustrated in FIGS. 4A-4C. Non-limiting examples include a groove in one of the first and second members configured to receive the other of the first and second members, a butterfly connector that connects the first and second members, a plate coupled to one of the first and second members and a foot or cotter pin extending through the plate and into the other of the first and second members, and brackets, such as L-shaped brackets.

It should be understood that first magnet and second component may be exchanged in the magnetic joint 400 illustrated in FIGS. 4A-4B. That is, second component 406 may be secured in the recess 416 in the first member 401, and the first magnet 403 may be inserted through through-hole 441 in the second member 402.

Figure 1C:
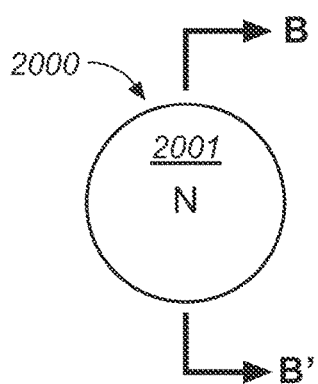
FIG. 1C-1D illustrate an axially magnetized permanent magnet.
Figure 1D:
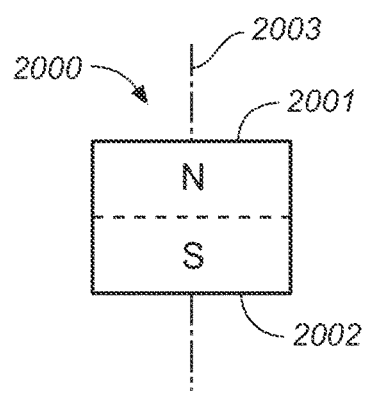
Figure 1E:
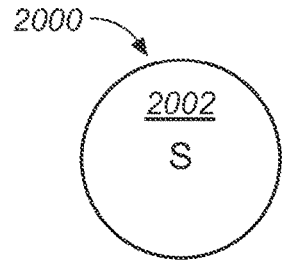

Axially magnetized permanent magnets may be utilized in any of the magnetic fasteners and magnetic joints described herein. A permanent magnet material or magnetically hard material a substance that is magnetized and produces a persistent magnetic field. A disk-shaped axially magnetized permanent magnet 2000 is illustrated in FIGS. 1C-1C. FIG. 1C provides a top view, FIG. 1E provides a bottom view, and FIG. 1D provides a section view along section line B-B'. The opposing planar faces 2001 and 2002 have opposite magnetic poles. The approximate direction of the magnetic field produced by the magnet 2000 in free space near the center of the circular cross-section is indicated by solid line 2003.

The first magnet and second component in any of the magnetic fasteners and magnetic junctions as described herein may be selected to be magnetically attracted to each other with sufficient force to provide the fastener with sufficient strength for its intended application. A magnetic fastener or joint strength may depend on how many fasteners are used to couple together the members, the spacing between fasteners, the mass of the members being joined, the geometry of the members being joined, and any combination thereof. In some variations, a specific calculation or analysis for load bearing requirements for an article using the magnetic fasteners and joints may be carried to determine the number and type of magnetic fasteners and joints to use, and the type of magnets used. The second component may be any component that is magnetically attracted to the first magnet. The second component may in some variations be or comprise a second magnet, with its pole oriented such that it is attracted to the first magnet in axial direction. If the second component is or comprises a magnet, it may be magnetized axial to its planar face. In some variations, the second component comprises a ferromagnetic material. Any suitable ferromagnetic material may be used that is sufficiently attracted to the first magnet. Non-limiting examples of ferromagnetic materials that may be used include iron, nickel, cobalt, and alloys and combinations thereof, and ferromagnetic materials comprising rare earth elements.

The first magnet and second component can have any suitable shape. In some variations, each of the first magnet and second components have planar and parallel opposing faces and are disk-shaped, with a circular circumferential shape. In some variations, each of the first magnet and second component has planar and parallel opposing faces and has a square circumferential shape. In some variations, each of the first magnet and second component has planar and parallel opposing faces and has an oval or elliptical circumferential shape. In some cases, a first magnet or second component has a countersink or counter bore configure to receive a screw, so that it can be mounted with its planar face exposed and available to make a planar magnetic junction. Any suitable thickness of a magnet or second component in a direction perpendicular to its planar face may be used, e.g., a thickness may be about ⅛ inch, about ¼ inch, about ⅜ inch, or about ¼ inch. Magnets or second components being thicker or thinner may be used, depending on the application. A magnet or second component may have any suitable cross-sectional dimension. In some cases, a disk-shaped magnet or second component having a cross-sectional diameter of about ⅛ inch, about ¼ inch, about ⅜ inch, about ¼ inch, about ⅝ inch, about ¾ inch, about ⅞ inch, or about 1 inch may be used. Magnets or second components having larger or smaller cross-sectional dimensions may be used, depending on the application. In some cases, magnets and/or second components comprise a rubbery or non-slip or rough surface or coating on their planar faces to limit sliding or slipping along the planar magnetic junctions. In some cases, one or more shielding components, layers and/or coatings may be used to limit or control stray magnetic fields produced by magnets used in the fasteners and junctions. For example, in some variations, a back shielding plate may be applied to one or more magnets used.

Any suitable permanent magnets may be used in the magnetic fasteners and joints. In some cases, at least one magnet used in the joints or fasteners is a disk-shaped magnet that is axially magnetized. In some cases, two disk shaped magnets that are axially magnetized are used in a magnetic fastener or joint described herein. In some cases, at least one rare earth magnet may be used in a magnetic fastener or joint. For example, at least one magnet may be a neodymium-containing rare earth magnet. In some cases, two rare earth magnets are used in a magnetic fastener or joint. For example, both rare earth magnets may be neodymium-containing rare earth magnets. In some cases, two disk-shaped rare earth magnets are used in a magnetic fastener or joint, e.g., both magnets may be disk-shaped neodymium rare earth magnets.

The strength of a magnet can be characterized by a pull force. In some cases a magnet used in the magnetic fasteners and magnetic joints described herein may exhibit a pull force measured as a tensile force using a force gauge between the planar face of the magnet and a thick steel plate as a function of distance between the steel plate and the magnet's planar face at 0 distance between the steel plate and the magnet. The pull force of the magnets used herein may be at least about 0.1 lb., at least about 0.2 lbs., at least about 0.3 lbs., at least about 0.4 lbs., at least about 0.5 lbs., at least about 0.6 lbs., at least about 0.7 lbs. at least about 0.8 lbs., at least about 0.9 lbs., at least about 1 lb., at least about 2 lbs., at least about 3 lbs., at least about 4 lbs., at least about 5 lbs., at least about 6 lbs., at least about 7 lbs., at least about 8 lbs., at least about 9 lbs., or at least about 10 lbs.

Permanent magnets used in any of the magnetic fasteners and joints described herein can be characterized by any combination of the following properties: residual magnetic induction, which is a measure of the strength of the magnetic field, denoted by $B_r$ and measured in gauss (G) or Tesla (T); intrinsic coercive force or coercivity, which is a measure of the material's resistance to becoming demagnetized, denoted by $H_{ci}$ and measured in kA/m or Oersted, Oe; magnetic energy density or maximum value energy product denoted by $(BH)_{max}$ and measured in kJ/m$^3$; and Curie Temperature, the temperature at and above which a material becomes demagnetized, denoted as $T_c$ and measured in degrees Celsius. A permanent magnet used in the magnetic fasteners and magnetic junctions described herein may have an intrinsic coercive force greater than about 100 Oersted. A permanent magnet may be naturally occurring, such as lodestone (magnetite), a mineral that contains iron. A permanent magnet may be a synthetic magnetic material. Non-limiting examples of synthetic permanent magnets include alnico magnets, made from aluminum-nickel-cobalt alloys that may also contain copper and/or titanium; ferrite (ceramic) magnets, having the general chemical formula $MO.6Fe_2O_3$, where M denotes barium or strontium, or a combination of barium and strontium; rare earth magnets; or iron-chromium-cobalt magnets, which are made from iron-chromium-cobalt alloys having about 15 to about 35 weight percent chromium, about 5 to about 20 weight percent cobalt, with the balance of the weight being iron, and may contain vanadium, silicon, titanium, zirconium, manganese, molybdenum, and/or aluminum. Flexible magnets may be made by embedding particles of permanent magnets (typically dry ferrite powder) into a flexible polymeric material.

Rare earth magnets may be 1-5 or cobalt 5 magnets that may be binary or ternary alloys with a composition having approximately 5 cobalt atoms per rare earth element atom. The rare earth element may be samarium, but could also be a different light rare earth element such as praseodymium, cerium, or neodymium, or a combination of any of the foregoing, or a heavier rare earth element such as dysprosium, gadolinium, or erbium. The rare earth accounts for about 34 to about 39% of the weight percent of the alloy. Rare earth magnets may be 2-17 or rare earth 2 transition metal 17 alloys. These alloys have a composition that is about 2 rare earth element atoms to about 13-17 transition metal atoms. The rare earth may be for example samarium, praseodymium, cerium, neodymium, dysprosium, gadolinium, erbium, or a combination of any two or more of the foregoing. The transition metal content is cobalt-rich combination of cobalt, iron, and copper. Small amounts of hafnium, zirconium, or other elements may be added. The 2-17 alloys may be about 23 to about 28 by weight rare earth elements.

Rare earth magnets may be rare earth iron alloys. The composition of rare earth iron alloys is about two rare earth element atoms to about 14 transition metal atoms to one boron atom, to have a chemical composition that can be denoted as $RE_2TM_{14}B$. The transition metal is iron, or a mixture in which cobalt substitutes for about 3 to about 15 percent of the iron. The rare earth elements may be for example samarium, praseodymium, cerium, neodymium, dysprosium, gadolinium, erbium, or a combination of any two or more of the foregoing. In many cases, the rare earth content is a combination of Neodymium, Praseodymium, and Dysprosium. The rare earth element content of $RE_2TM_{14}B$ magnets may be about 30 to about 35 weight percent.

Alnico permanent magnets typically have $H_{ci}$ in a range from about 480 Oe to about 2200 Oe, $B_r$ in a range from about 6700 G to about 13500 G, and $(BH)_{max}$ in a range from about 11 kJ/m$^3$ to about 72 kJ/m$^3$. Ceramic permanent magnets typically have Hci in a range from about 2500 Oe to about 5000 Oe, $B_r$ in a range from about 2300 G to about 4100 G, and $(BH)_{max}$ in a range from about 8 kJ/m$^3$ to about 32 kJ/m$^3$. RE-Co5 permanent magnets typically have $H_{ci}$ in a range from about 16000 Oe to about 30000 Oe, $B_r$ in a range from about 8500 G to about 9500 G, and $(BH)_{max}$ in a range from about 130 kJ/m$^3$ to about 180 kJ/m$^3$. $RE_2TM_{17}$ permanent magnets typically have $H_{ci}$ in a range from about 7000 Oe to about 26000 Oe, $B_r$ in a range from about 1000 G to about 12000 G, and $(BH)_{max}$ in a range from about 190 kJ/m3 to about 240 kJ/m$^3$. $RE_2TM_{14}B$ permanent magnets typically have $H_{ci}$ in a range from about 10000 Oe to about 41000 Oe, $B_r$ in a range from about 1000 G to about 14000 G, and $(BH)_{max}$ in a range from about 190 kJ/m3 to about 400 kJ/m3. Iron-chromium-cobalt permanent magnets typically have $H_c$ in a range from about 250 Oe to about 600 Oe, $B_r$ in a range from about 8800 G to about 14000 G, and $(BH)_{max}$ in a range from about 8 kJ/m3 to about 35 kJ/m$^3$.

In some variations, the permanent magnets used are neodymium-iron-boron ($Nd_2Fe_{14}B$) magnets, which are a variation of the $RE_2TM_{14}B$ rare earth magnets. These magnets are available in a range of grades (strengths), sizes, shapes, and configurations. For example one grade of $Nd_2Fe_{14}B$ permanent magnet has a $B_r$ of about 11000 G, $H_{ci}$ of about 30000 Oe, and $(BH)_{max}$ of about 30 MGOe, another grade has $B_r$ of about 12000 G, $H_{ci}$ of about 25000 Oe, and $(BH)_{max}$ of about 38 MGOe, another grade has Br of about 13000 G, $H_{ci}$ of about 16000 Oe, and $(BH)_{max}$ of about 44 MGOe, and yet another grad has $B_r$ of about 14000 G, $H_{ci}$ of about 11000 Oe, and $(BH)_{max}$ of about 50 MGOe. In some variations, a grade N42 or grade N52 neodymium rare earth magnet may be used, such as grade N42 or grade N52 neodymium magnets available from K&J Magnetics, Inc., Pipersville, Pa. Rare earth magnets may be coated to prevent oxidation and other mechanisms for degradation. Permanent magnetic materials may be brittle, and a coating may reduce the probability that a magnet will crack, chip, or break apart. Any suitable type of coating to protect against oxidation may be used, and any application method may be used. For example, a coating may be plated, painted, or coated on. For example, nickel, tin, or zinc coatings may be used. In some cases, a coating may be made of more than one layer. For example, a coating may comprise two layers of nickel coating, optionally with a layer of copper in between the layers of nickel. Coatings may be applied by vapor deposition, e.g., aluminum chromate or cadmium chromate coatings may be applied through available vapor deposition techniques. In some cases, a coating is organic any may for example be applied through painting, dipping, electrostatic deposition of powder that is then cured, and the like. Non-limiting examples of suitable coating materials include: nickel, tin, zinc, copper, silver, gold, and epoxy.

FIGS. 5A-5B provide an example of a magnetic joint employing one or more magnetic fasteners as described herein. In this example, the joint 590 includes a magnetic fastener 500 such as that illustrated in FIG. 1A-1B, 2A-2B, or 3A-3B. The fastener 500 restricts relative movement of the members 501 and 502 in x-, y- and z-directions. In some cases, the members 501 and 502 are rigid or stiff, or are rigid or stiff in at least two dimensions. In some cases, one of members 501 and 502 may be rigid or stiff in three dimensions, and the other member may be rigid or stiff in two dimensions. In the particular configuration illustrated in FIG. 5A, first magnet 503 has a planar face 513 and is magnetized axially relative to its planar face. The first magnet is secured in recess 516 in member 501. A second magnet 506 has a planar face 514 and is axially magnetized relative to the planar face. The second magnet is secured to surface 511 of member 502, and when fastener 500 is engaged, the second magnet 506 is received into recess 516 of member 501, so that a planar magnetic junction is formed within the recess 516, as indicated by dashed line 507. In this example, the mating surface 511 of second element 502 forms a planar junction with the mating surface 512 of the first element 501, as indicated by dashed line 560. The planar magnetic junction as indicated by dashed line 507 is offset relative to the junction between the first and second elements, as indicated by dashed line 560. Magnet 503 is secured in recess 516 using any suitable means, e.g., adhered or mounted using a countersink, and magnet 506 is secured to surface 511 using any suitable means, e.g., using an adhesive or a countersink or counter bore to secure to surface 511 so that the planar faces 513, 514 of the magnets form a planar junction indicated by dashed line 507 within the recess 516, thereby forming a plug that resists motion in the y- and z-directions, where for FIG. 5A, the z-direction is perpendicular to the plane of the page of the drawing. The axial magnetic attraction between the magnets 503 and 506 limits relative motion in the x-direction and the side walls 527 of the recess 516 protect the magnetic junction from being broken due to shear force applied in the y- or z-directions. The first member 501 may be susceptible to being dislodged or peeled away from second member 502, for example, if an edge 585 catches on an uneven or rough surface, or if the joint is suddenly jolted. The edge 585 may be beveled or rounded to reduce catching against a rough or uneven surface. Optionally, a coupling device that secures member 501 to 502 in the x-direction may be employed to reduce the probability that the members 501 and 502 are unintentionally separated. For example a coupling device may comprise a plate 550 such as that illustrated in FIG. 5B. FIG. 5B shows a view of the plate from the bottom of joint 590, with the foot 578 not inserted into the through-hole 577. The dashed line 561 indicates a position of the junction between the first and second elements. The plate 550 is secured to member 501 (e.g., using a screw 553, nail, adhesive, or the like) and extends in the x-direction to be received by member 502. In this particular example, member 502 comprises a recess 584 configured for receiving plate 550. Member 502 comprises a recess 583 extending in the y-direction. The cross-sectional dimensions of recess 583 are selected so that a permanent magnet 582 having a planar face 581 and being axial magnetized relative to planar face 581 can be positioned in the recess 583 in an axial manner with its planar face 581 facing outward and but still remaining within the recess 583. The magnet 582 may be secured in the recess in any manner, for example by adhering to the bottom surface 580 of the recess 583, by adhering to side walls 579, or by using a countersink in the magnet to mount to the bottom surface 580. The plate 550 comprises a through hole 577 that is aligned with the recess 583, so that a foot 578 may be inserted through the through-hole 577 into the recess 583. The foot comprises a permanent magnet 576 having a planar face 575 facing away from a base 574, where the planar face 575 of magnet 576 is selected to be of an opposite pole to that of planar face 581 of magnet 582. The magnetic attraction between the two magnets draws the foot 578 into the recess 583, forming a planar magnetic junction in the x- and z-directions with an axial magnetic force along the y-direction. Optionally, the foot has a base 574 that has a cross-sectional dimension so as to not pass through through-hole 577. Optionally, there is no magnetic junction that holds the foot 578 into the recess 583. For example, the recess 583 may not include a magnet, and the foot 578 may be press-fit, friction fit, or otherwise secured in the recess 583.

It should be understood for the example shown in FIGS. 5A-5B that one of the first and second magnets may be replaced by a component that is magnetically attracted to the remaining magnet. Such a component may for example comprise a ferromagnetic material, with non-limiting examples including iron, nickel, cobalt, and alloys and combinations thereof, and rare earth ferromagnetic materials.

Figure 6A:
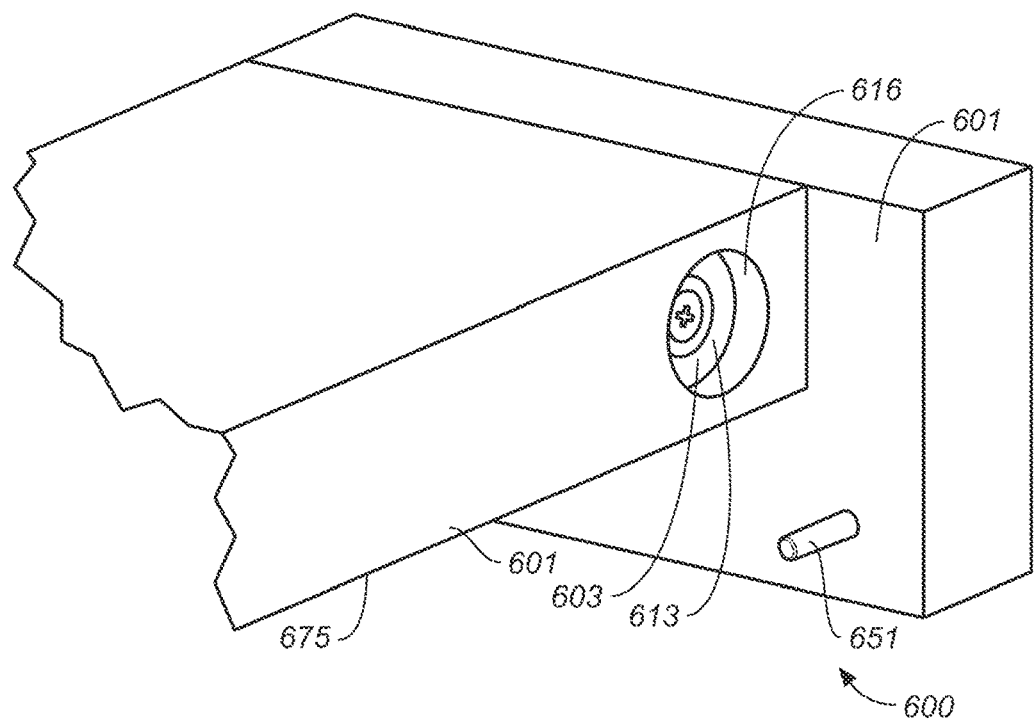
FIGS. 6A-6E show another example of a joint using a magnetic fastener.
Figure 6B:
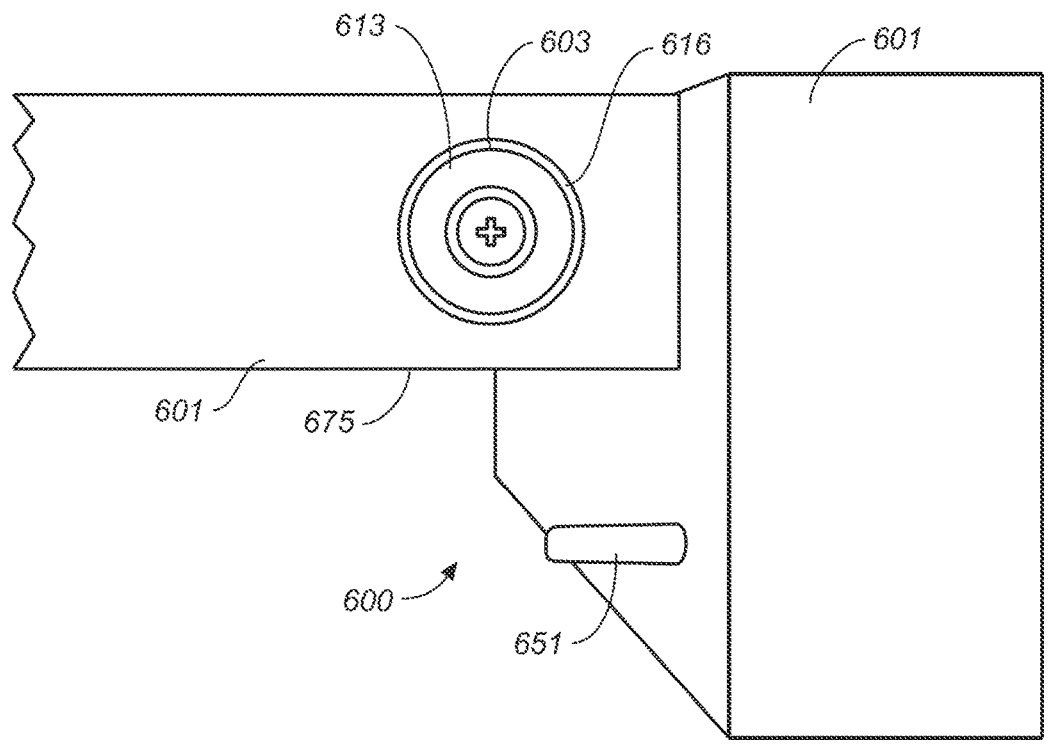
Figure 6D:
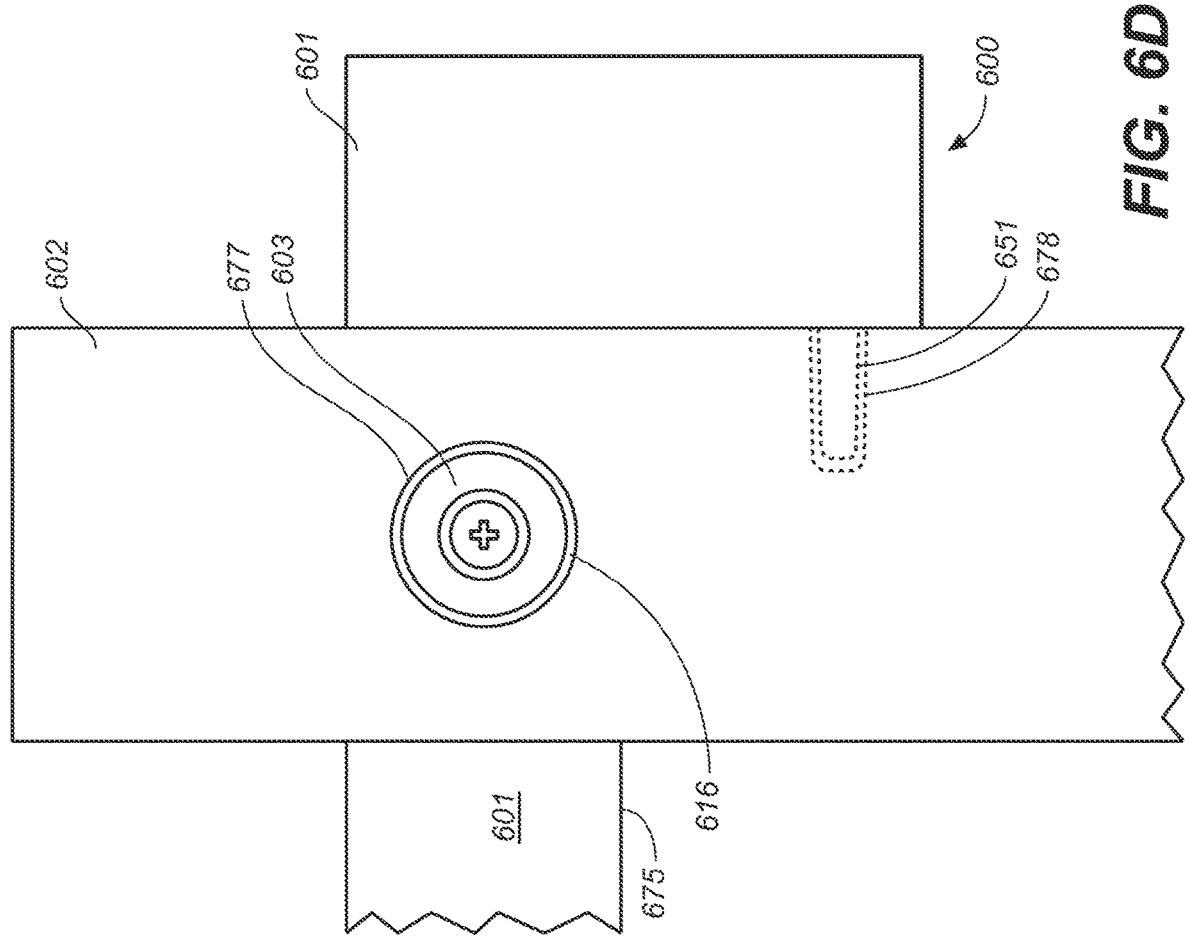
Figure 6C:
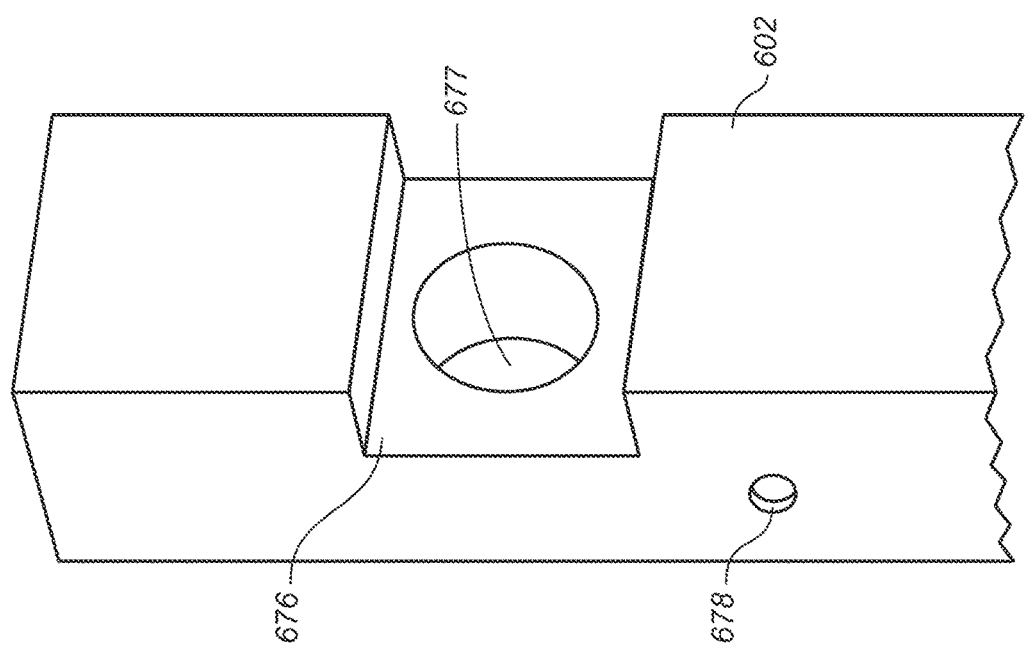
Figure 6E:
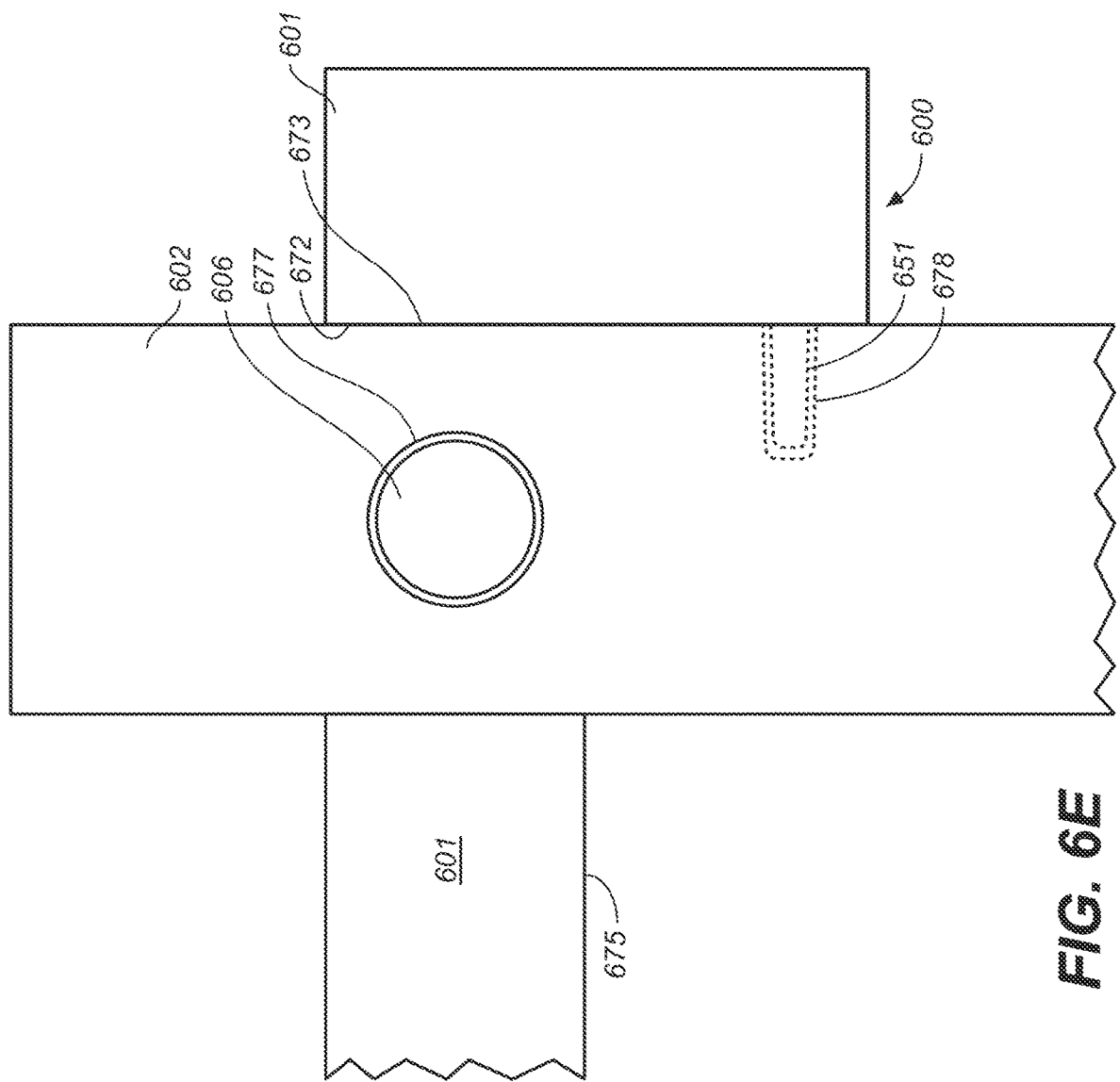

FIGS. 6A-6E provide an example of a magnetic joint as illustrated in FIGS. 4A-4C. The magnetic joint 600 joins first member 601 to member 602 so that the joint is stable and secure in the x-, y- and z-directions. In some cases, the members 601 and 602 are rigid or stiff, or are rigid or stiff in at least two dimensions. In some cases, one of members 601 and 602 may be rigid or stiff in three dimensions, and the other member may be rigid or stiff in two dimensions. A first member 601 comprises a first magnet 603 having a planar face 613 and is axially magnetized relative to the planar face. The magnet 603 is secured in a recess 616 with its planar face 613 facing outward from the recess. Secured to the first member 601 is a pin or dowel 651 that extends in a direction perpendicular to the planar face of the magnet 603. A second member 602 comprises a through-hole 677 that has the same circumferential shape and circumferential dimension as the recess 616. The second member 602 also comprises a recess 678 configured to receive the pin or dowel 651. Member 602 comprises a slot 676 which is configured to receive an arm 675 of member 601. When arm 675 is received in slot 676, the through-hole 677 can be aligned with the recess 616 to form a continuous barrel. When forming the joint between the first and second members 601 and 602, the first and second members are fitted together by inserting the pin or dowel 651 into the recess 678, and fitting the arm 675 into the slot 676 to align through-hole 677 over recess 616 to form a continuous barrel, as illustrated in FIG. 6D. As illustrated in FIG. 6E, a second magnet 606 is inserted in an axial manner into the through-hole 677. Magnet 606 has a planar face (not shown and directed into the through-hole), and is axially magnetized relative to the planar face. The planar face of magnet 601 has the opposite pole to planar face 613 of magnetic 603. The magnetic attraction between the two planar faces of the magnets draws the second magnet 606 into the recess 616 so that it is partially extending into recess 616 and remains partially within through-hole 677. The planar magnetic junction is positioned within the recess 616, and the portion of the second magnet that extends into the through-hole 677 resists side to side movement along and perpendicular to the junction between surface 673 of member 601 and surface 672 of member 602. Axial movement is by the pin or dowel 651 disposed in recess 678. To disassemble the joint 600, another permanent magnet may be used to extract the second component 606 out through the through-hole 677.

It should be understood for the example shown in FIGS. 6A-6E that one of the first and second magnets may be replaced by a component that is magnetically attracted to the remaining magnet. Such a component may for example comprise a ferromagnetic material, with non-limiting examples including iron, nickel, cobalt, and alloys and combinations thereof, and rare earth ferromagnetic materials.

Figure 7A:
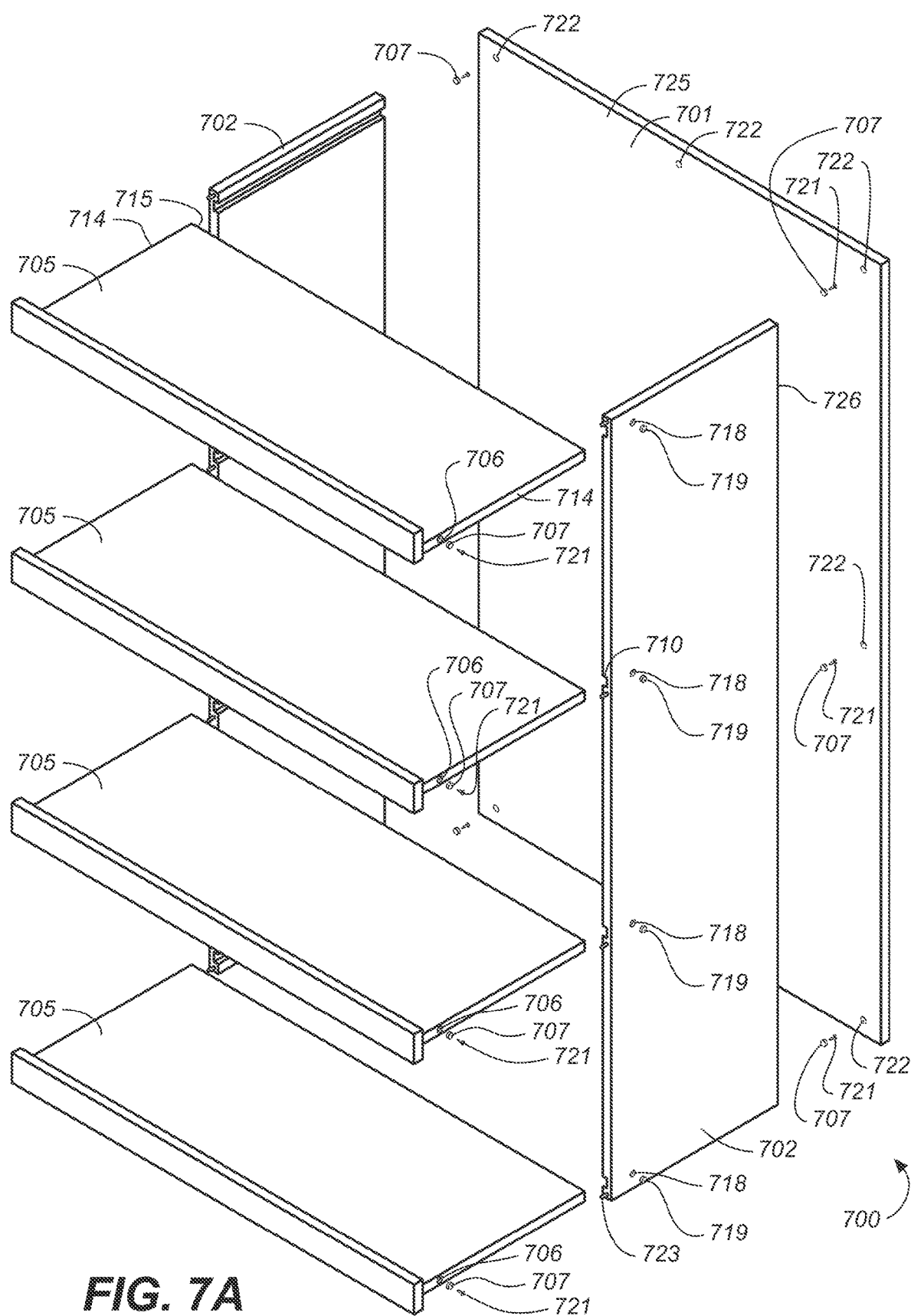
FIGS. 7A-7D show an example of a shelving unit using the magnetic fasteners.
Figure 7B:
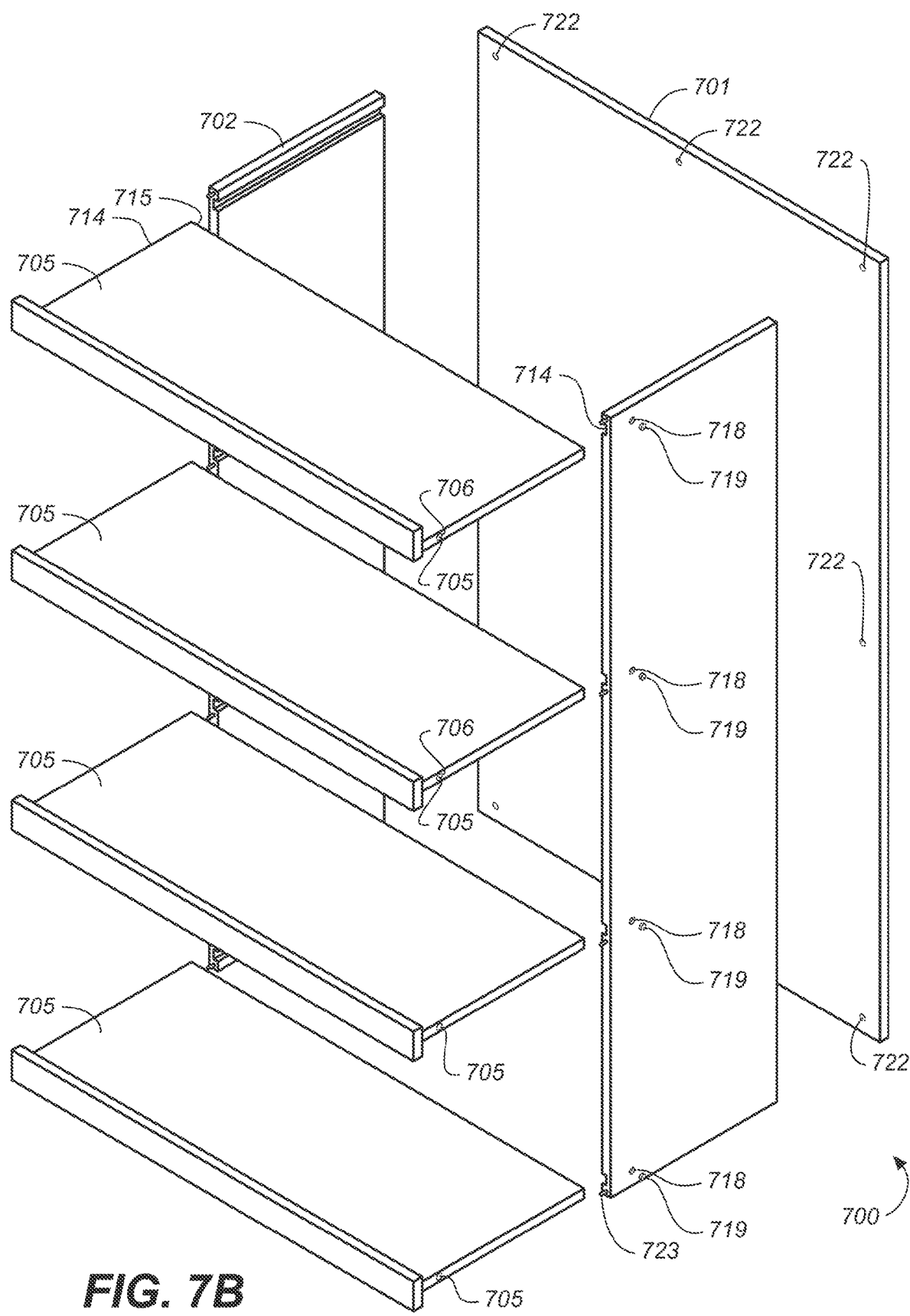

FIGS. 7A-7D illustrate assembly of a shelving unit that may be reversibly assembled using multiple magnetic fasteners and magnetic joints as described herein. The shelving unit may be made from any suitable material, e.g., wood, carbon fiber materials, fiberglass, laminates, masonite, press board, waferboard, composites, plastic, reconstituted or recycled wood products, reconstituted or recycled plastic products, non-magnetic metal such as aluminum, or any combination of two or more of the foregoing. Non-limiting examples of laminates that may be used include veneered laminates (e.g., wood-veneered laminates), plastic laminates (e.g., Formica® laminates), hollow core laminates, laminates with corrugated cores, and waferboard laminates. In some cases, a face frame and/or surface piece of a shelving unit may be made from a material that is stiff or rigid in two dimensions but can be flexed (e.g., rolled up) in the third dimension. Non-limiting examples of materials that are stiff or rigid in two dimensions but can be flexed in the third dimension include carbon fiber sheet, fiberglass sheet, thick plastic sheet, laminates, and thin non-magnetic metal sheets. Different components of the shelving unit may be made from the same materials, or from different materials. The shelving unit 700 comprises a back 701, two opposing sides 702, and shelves 705. Any number of shelves may be used. In some cases, a shelving unit may not have a back, and instead may have a rear face frame. In some cases, a shelving unit may not have a top shelf. In some cases, a shelving unit may not have a bottom shelf. Referring first to FIGS. 7A-7B, some of the components of the shelving units comprises at least one recess 706 containing a magnet 707 that has a countersink and is secured in the recess with a screw 721, and a mating piece having a protruding magnet of the opposite pole configured to be received in the recess, as illustrated and described herein, e.g., in relation to FIGS. 1A-1B, 2A-2B and 4A-4C. In this particular example, recessed magnets 707 are positioned on rear facing surfaces 715 of shelves 705, on side facing surfaces 714 of shelves 705, and on rear facing surfaces 726 of sides 702. The protruding mating magnets 722 are positioned on front surface 725 of back 701. The protruding magnets 722 may have countersinks for securing to surface 725. The protruding magnets 722 are positioned on the back surface to align with and mate with the recessed magnets 707 positioned on rear surfaces 715 of shelves 705 and on rear surfaces 726 of sides 702. When the shelving unit is assembled, the protruding magnets 722 are received into recesses 706 to form planar magnetic junctions with magnets 705 within the recesses so that the magnetic junctions are offset from the junctions between the back and shelves, and between the back and sides. Optionally, the magnets may be secured in the recesses at the factory so that the user is not required to use tools. Optionally, the magnets may be secured in the recesses by a user.

Figure 7C:
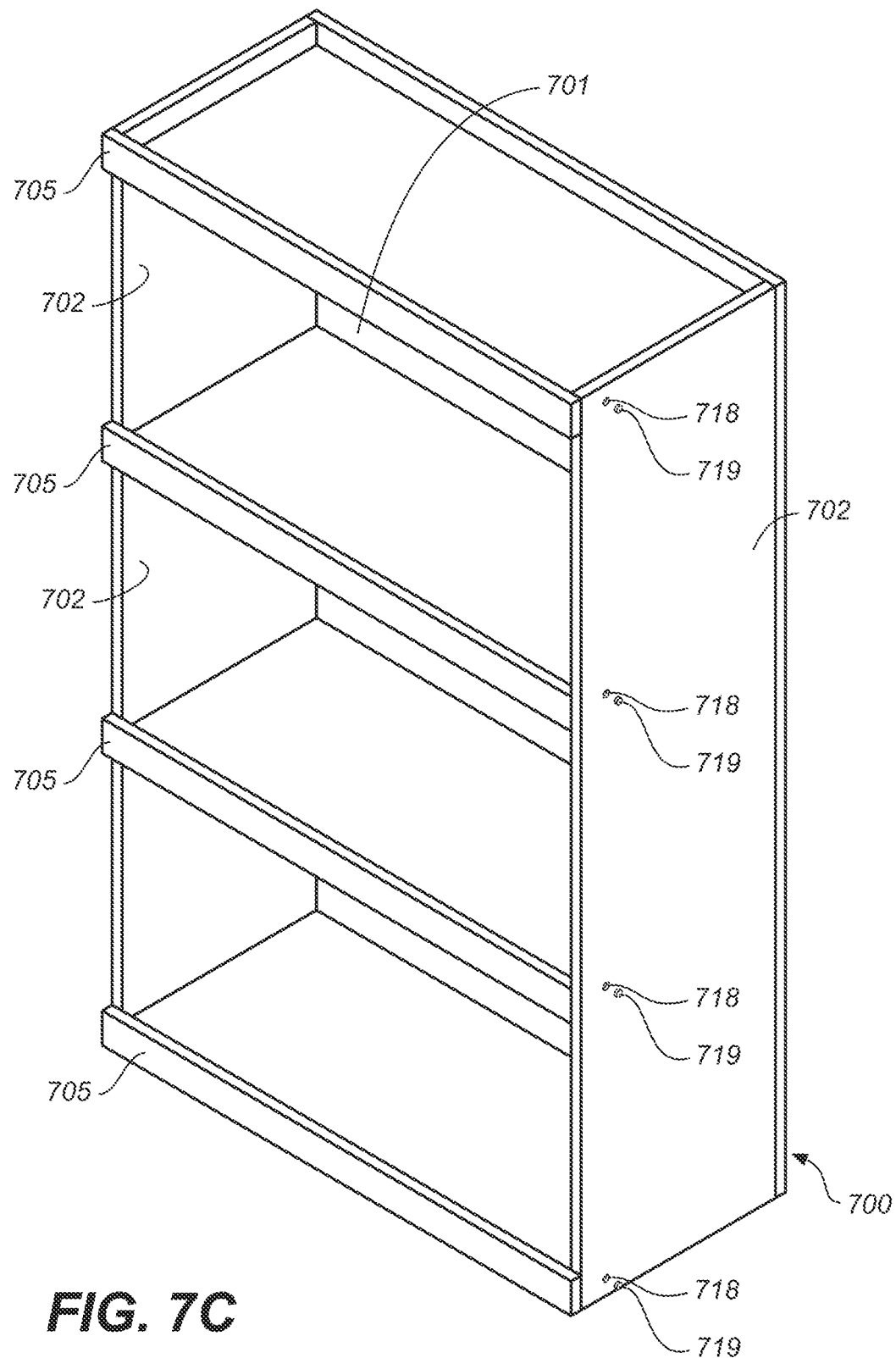
Figure 7D:
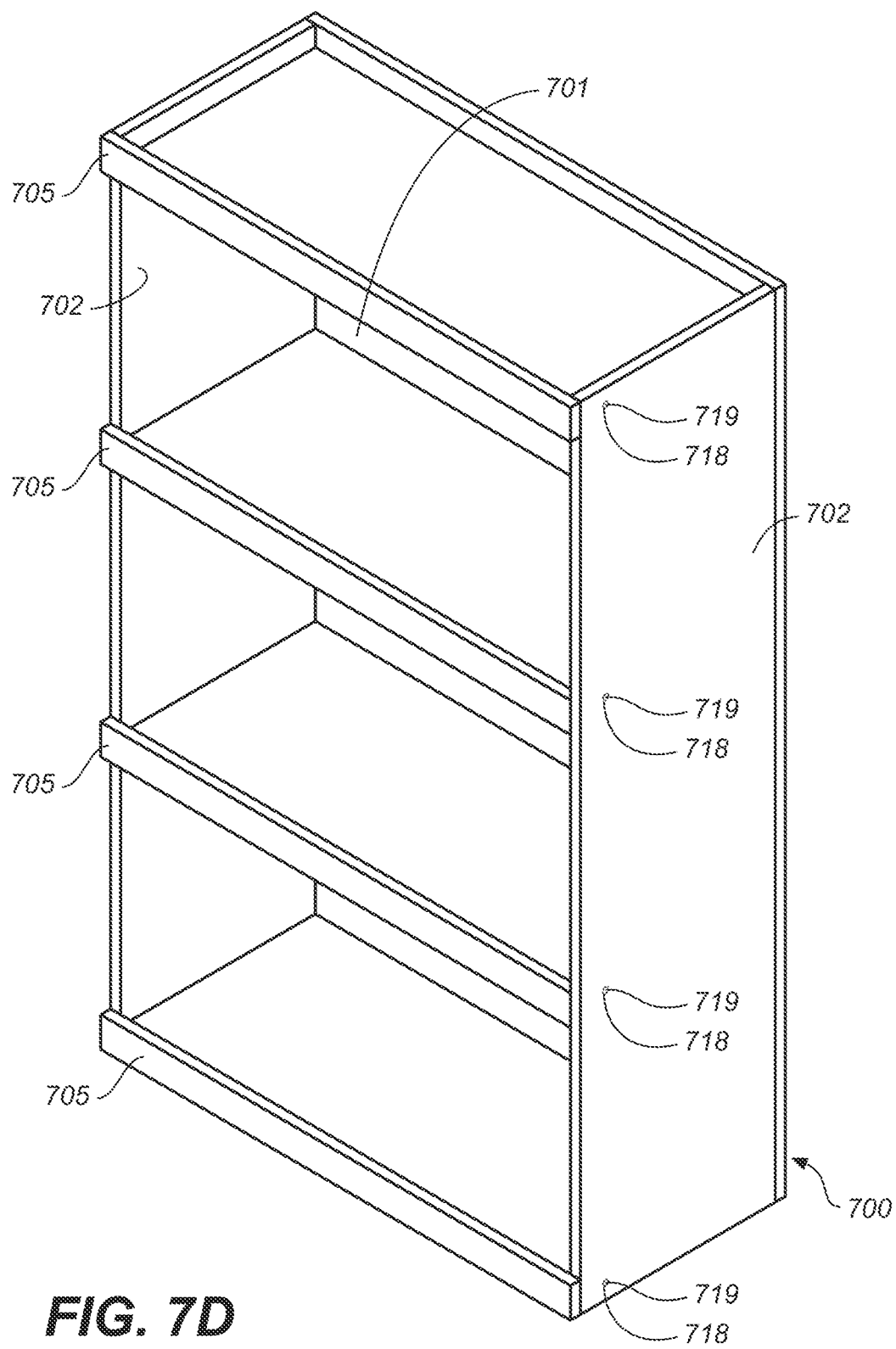

The shelves 705 are configured to slide into grooves 710 in the sides 702. The front surfaces 727 of sides 702 comprise pins 723 that extend away from the front surfaces 727. The rear surfaces of shelves 705 comprise recesses configured to receive the pins 723 when the shelves are inserted into the grooves 710. Referring now to FIGS. 7C-7C, the shelves 705 are joined to the sides using magnetic fasteners as illustrated in and described in relation to FIGS. 4A-4C, and 6A-6E. Sides 702 comprise through-holes 718 that are aligned with grooves 710. A magnet 719 having a planar face and a magnetic field axial to the planar face and a pole opposite to that of the planar face of mating magnets 705 are inserted into the through-holes, where it is drawn in by the magnetic attraction between the two magnets and is received in the recess 716. A planar magnetic junction is formed within the recess 716, and the magnet 719 is selected to have a depth so that it protrudes out of recess 716 into the through-hole 718. When assembling the shelving unit 700 as illustrated in FIGS. 7A-7D, any order of assembling the sides, back, and shelves can be used. It should be understood that in any of the magnetic junctions in the shelving unit, one of the magnets in the junction can be replaced by a component that is magnetically attracted to the remaining magnet, as described herein. It should be understood that in some cases, it may be desired to permanently fix one or more magnetic junction in the shelving unit using an adhesive as described herein.

Figure 8A:
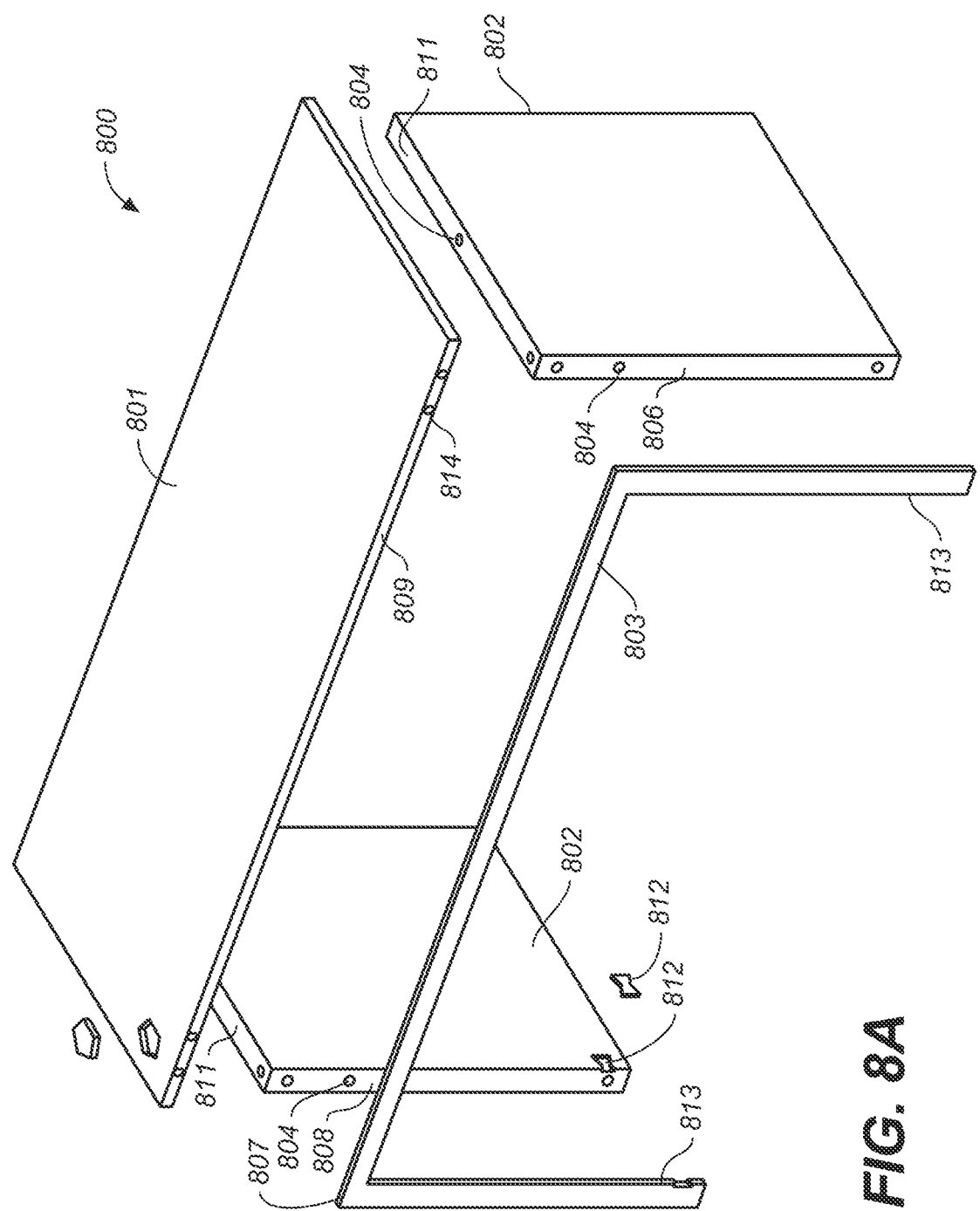
FIGS. 8A-8C show an example of a desk using the magnetic fasteners.
Figure 8B:
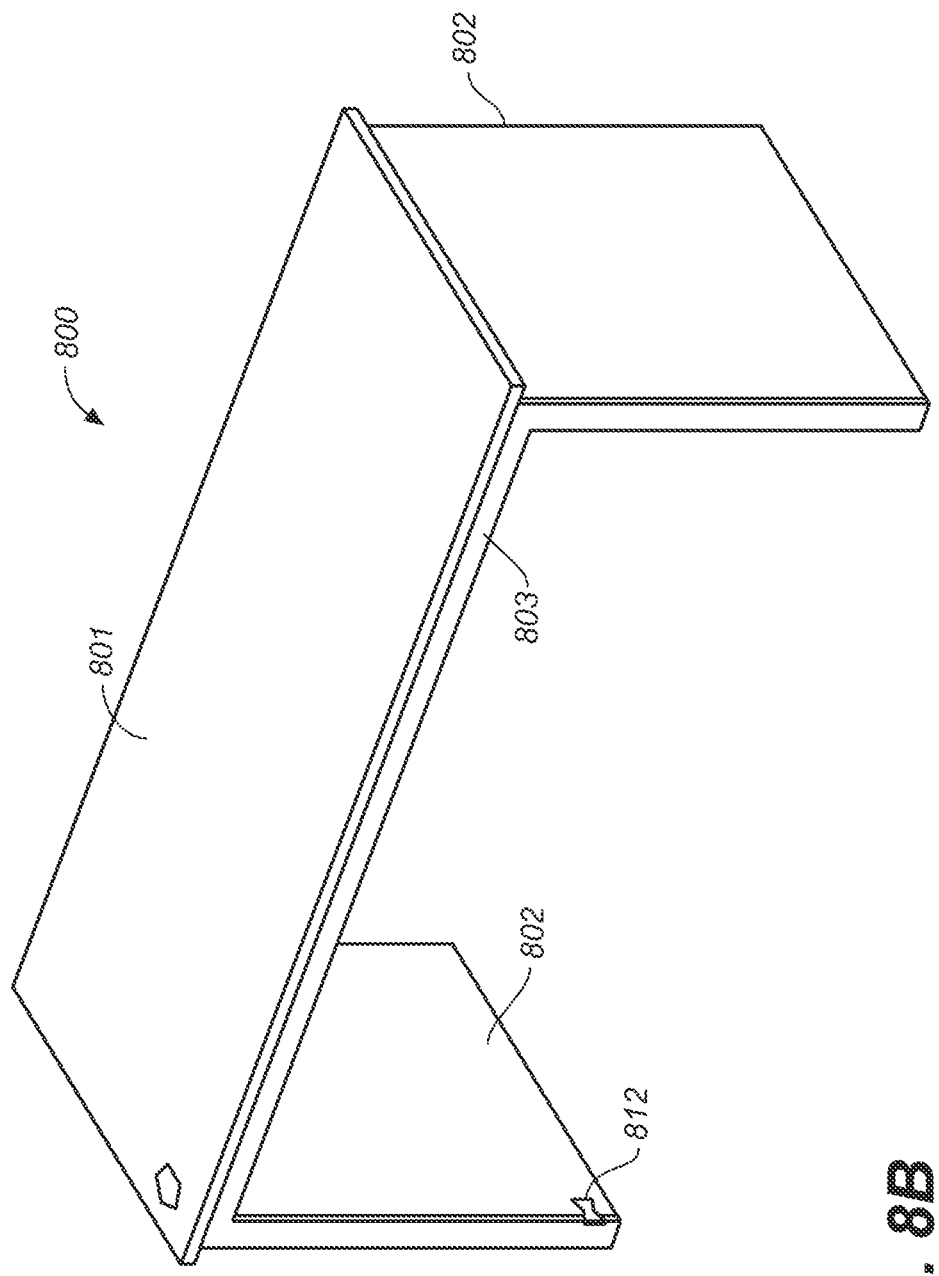
Figure 8C:
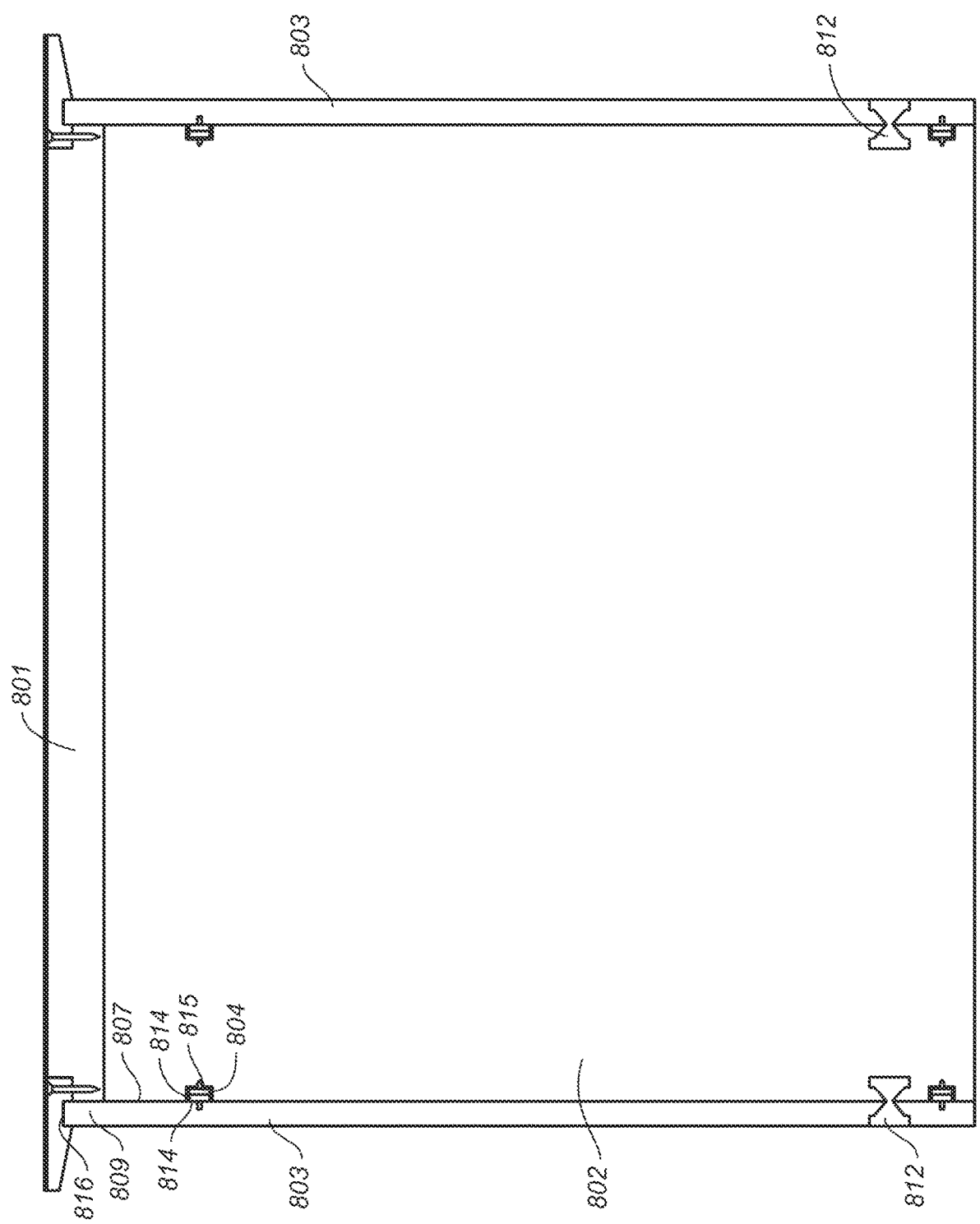

FIGS. 8A-8C illustrate a desk 800 that utilizes multiple magnetic fasteners and magnetic joints as described herein. The desk 800 may be made from any suitable materials, e.g., wood, carbon fiber materials, fiberglass, laminates, masonite, press board, waferboard, composites, plastic, glass, ceramic, reconstituted or recycled wood products, reconstituted or recycled plastic products, non-magnetic metal such as aluminum, or any combination of two or more of the foregoing. Non-limiting examples of laminates that may be used include veneered laminates (e.g., wood-veneered laminates), plastic laminates (e.g., Formica® laminates), hollow core laminates, laminates with corrugated cores, and waferboard laminates. In some cases, a face frame and/or top surface of a desk may be made from a material that is stiff or rigid in two dimensions but can be flexed (e.g., rolled up) in the third dimension. Non-limiting examples of materials that are stiff or rigid in two dimensions but can be flexed in the third dimension include carbon fiber sheet, fiberglass sheet, thick plastic sheet, laminates, and thin non-magnetic metal sheets. Different desk components may be made from the same materials or from different materials. FIG. 8A provides an exploded view of the desk, FIG. 8B provides a view of the assembled desk, and FIG. 8C provides a side cross-sectional view. The table 800 comprises a top piece 801, two side legs 802, and a face frame 803. End surfaces 808 of side legs and front face 809 of top piece 801 comprise multiple recesses 804. A magnet 815 has been secured into each of the recesses 804, as described in relation to FIGS. 1A-1B and 2A-2B. A rear facing surface 807 of face frame 803 comprises protruding magnets 814 that mate with magnets secured in recesses 804 to form planar magnetic junctions that are offset with respect to the planar junction between rear surface 807 of face frame, end surfaces 808 of the side legs, and a front face 809 of the top piece, as described in FIGS. 1A-2A, and 2A-2B. A bottom surface 810 of the top piece 801 may comprise protruding magnets (not shown) that mate with magnets secured in recess 804 in top end faces 811 of side legs 802 to form planar magnetic junctions that are offset with respect to the planar junction between the bottom surface 810 of the top piece and the top end surfaces 811 of the side legs 802. Optionally, the top piece 801 comprises a slot 816 configured to receive front plate 803 and secure the face frame against the surface 807 of the side legs 802. Optionally, one or more coupling devices 812 (which may be a butterfly as illustrated, or any other suitable coupling device) may be used near the base of each side legs to couple the face frame 803 to the front faces 808 of the side legs in a direction aligned with the magnetic attraction between the mating magnets to avoid the face frame being unintentionally dislodged or peeled off, e.g., if the desk is dragged along a rough or uneven surface. Optionally, a base region of legs 813 of face frame 803 may be rounded or beveled to reduce catching on floors. It should be understood that magnets may be recessed into face frame and be protruding from the side legs. In some variations, one of the magnets in one or more of the magnetic junctions is replaced by a component that is magnetically attracted to the remaining magnet, as described herein. It should be understood that one or more of the magnetic junctions in the desk 800 may be fixed using an adhesive as described herein.

Figure 8D:
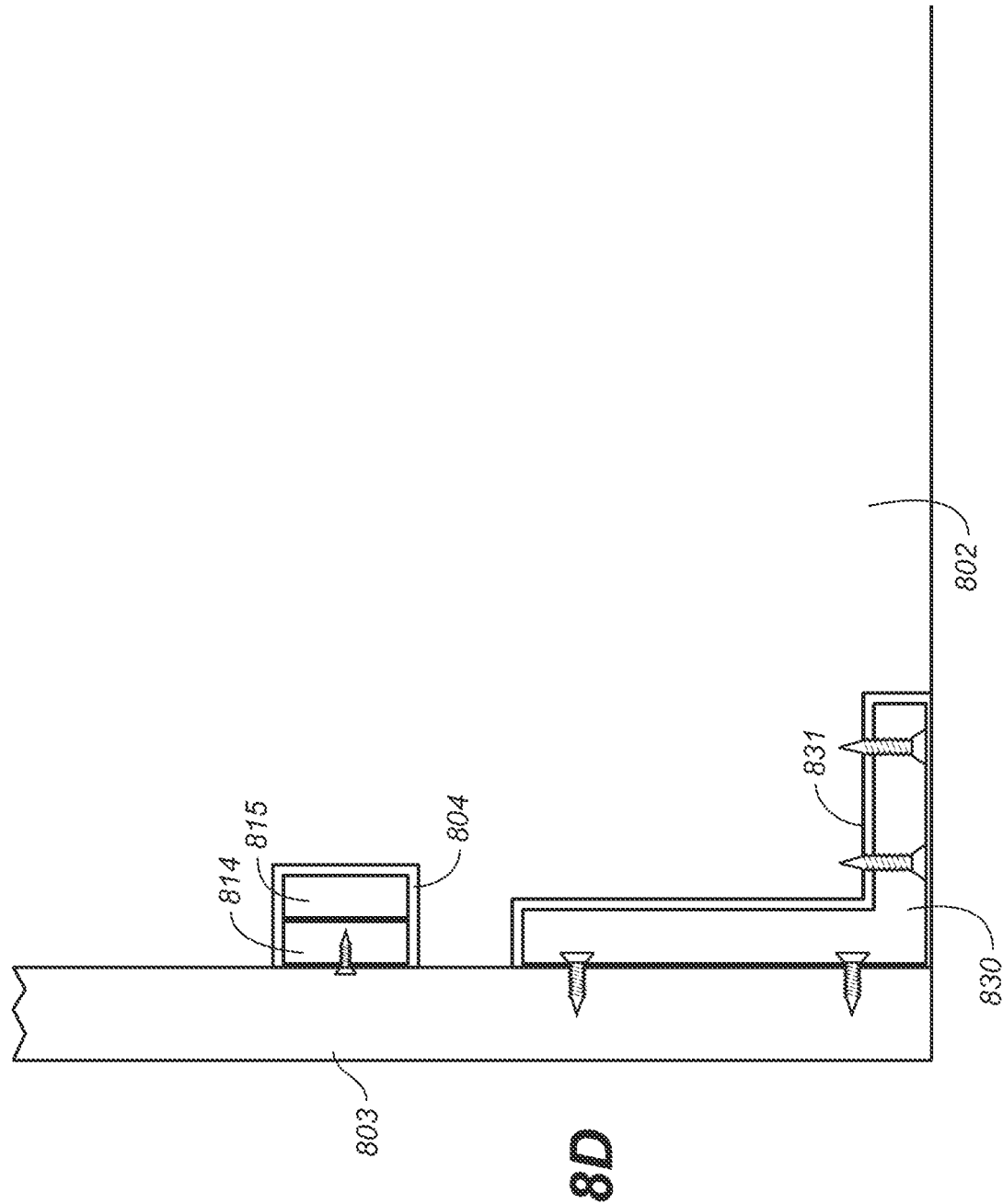
FIG. 8D shows an L-shaped coupling device.

As illustrated in FIG. 8D, an L-shaped bracket may be used instead of butterfly connectors to secure the face frame 803. The L-shaped bracket 803 may optionally be mounted in a recess 831, or may be mounted on exterior surfaces. The L-shaped bracket may be secured to face frame 803, e.g., using one or more screws or adhesive, and to side leg 803, e.g., using one or more screws or adhesive. In some cases, a face frame is cut closely to the side legs and top piece to reduce overhangs that may be grabbed or caught, resulting in the face frame becoming dislodged.

Figure 9:
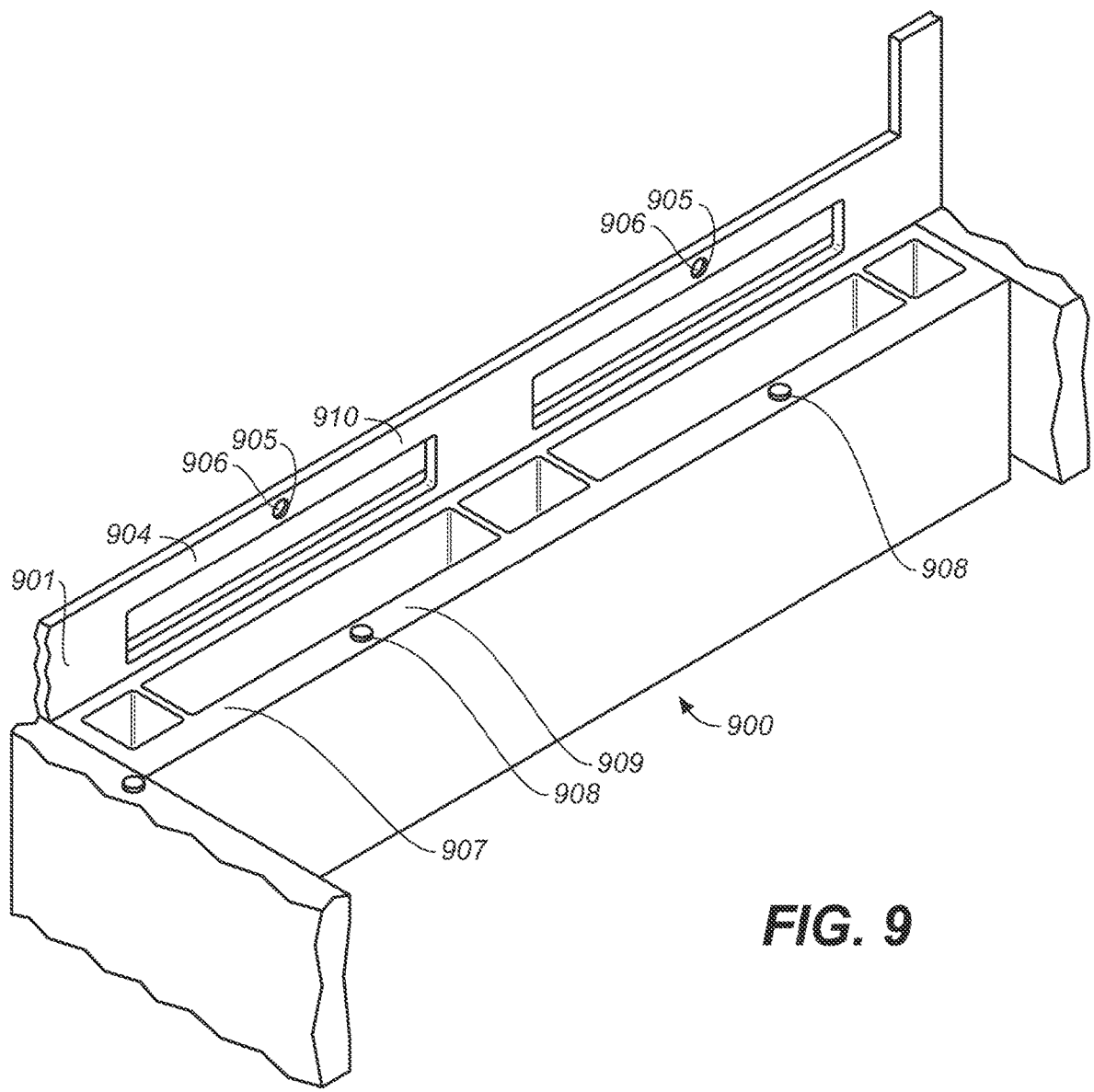
FIG. 9 shows another example of a desk using the magnetic fasteners.

FIG. 9 illustrates a desk 900 that comprises a removable face frame 901 that is coupled to the cabinet using one or more magnetic fasteners as described herein. The magnetic fasteners may, for example, be those as illustrated and described in connection with FIGS. 1A-1B or FIGS. 2A-2B. The desk 900 may be made from any suitable materials, e.g., wood, carbon fiber materials, fiberglass, laminates, Masonite, press board, waferboard, composites, plastic, glass, ceramic, reconstituted or recycled wood products, reconstituted or recycled plastic products, non-magnetic metal such as aluminum, or any combination of two or more of the foregoing. Non-limiting examples of laminates that may be used include veneered laminates (e.g., wood-veneered laminates), plastic laminates (e.g., Formica® laminates), hollow core laminates, laminates with corrugated cores, and waferboard laminates. In some cases, a face frame and/or top surface of a desk may be made from a material that is stiff or rigid in two dimensions but can be flexed (e.g., rolled up) in the third dimension. Non-limiting examples of materials that are stiff or rigid in two dimensions but can be flexed in the third dimension include carbon fiber sheet, fiberglass sheet, thick plastic sheet, laminates, and thin non-magnetic metal sheets. Different desk components may be made from the same materials or from different materials. The face frame 901 comprises a top end 903 having no magnetic fasteners and a bottom end 904 with a mating surface 910 that comprises recesses 905 with permanent magnets 906 secured in the recesses as described herein with respect to FIGS. 1A-1B and 2A-2C. The desk body 907 comprises magnets 908 that protrude from surface 909 and are aligned with and configured to be received in recesses 905 to form planar magnetic junctions with magnets 906 that are secured within the recesses 905. The planar magnetic junctions are offset from a planar junction between mating surface 909 of the desk body and the mating surface 910 of the face frame. During assembly, the top end 903 slides into a slot that is configured to receive the top end, and the protruding magnets 908 are received into recesses 905 to form the planar magnetic junctions and secure the magnetic fasteners. The sliding of the top end of the face frame into slot assists the magnets in securing the face frame to the desk. It should be understood that in some variations magnets may be recessed into the desk body and protruding from the face frame. In some variations, one of the magnets in one or more of the magnetic junctions in the desk 900 is replaced by a component that is magnetically attracted to the remaining magnet, as described herein. It should be understood that one or more of the magnetic junctions in the desk 900 may be fixed using an adhesive as described herein.

In some cases, it may be desired to temporarily or permanently fix a piece of furniture or other structure made with one or more of the magnetic fasteners or joints described herein. For example, a temporary or permanent adhesive may be applied between planar faces of magnetic junction, and/or between mating surfaces. In some cases, a two-part epoxy or the like can be used to fix a magnetic junction, or any other junction in the structure to secure the structure. The adhesive can be pre-applied to the surfaces to be secured, so that the adhesive temporarily or permanently adheres the surfaces to each other when the joint is completed through magnetic attraction. For example, the adhesive can be contained in a protective packet that is attached to a magnetic or non-magnetic surface that forms part of the joint, and as the mating piece is brought into contact, the packet is squeezed to release the adhesive, which can adhere the surfaces in a temporary or permanent manner, depending on the type and nature of the adhesive that is used. If a two-part epoxy or the like is used, a packet comprising a first adhesive component may be disposed on one of the magnetic planar faces or mating surfaces and a packet comprising a second adhesive component may be disposed on the other of the magnetic planar faces or mating surfaces so that when the joint is engaged, the first and second packets release their contents so that the first and second adhesive components mix and adhere the magnetic planar faces or mating surfaces.

Described herein are methods for making magnetic fasteners and magnetic junctions. In one aspect, a method comprises securing a first magnet to a first member and securing a second component that is magnetically attracted to the first magnet to a second member, such that when the fastener is engaged, the first magnet and the second component form a first planar magnetic junction, and a mating surface of the first member forms a second junction with a mating surface of the second member, and the first planar junction is offset from the second junction. In some variations, the junction between the first and second members is planar, and the first and second junctions are parallel to each other and offset relative to each other.

Described herein are methods for securing a first member to a second member using one or more magnetic fasteners or magnetic junctions as described in relation to FIGS. 1A-1B, 2A-2B, 3A-3B, 4A-4C, 5A-5B, and 6A-6E.

This disclosure is illustrative and not limiting. Further modifications will be apparent to one skilled in the art in light of this disclosure and are intended to fall within the scope of the appended claims.

What is claimed is:

1. An article-comprising:
   a first member;
   a second member;
   a first component comprising a planar face; and
   a second component that comprises a planar face, is secured to the second member, and is magnetically attracted to the first component;
   wherein:
   a circumferential shape and circumferential dimension of the first component is substantially the same as a circumferential shape and circumferential dimension of the second component;
   the second component is axially secured within a recess in a mating surface of the second member with its planar face being within the recess and facing outward, the recess having a circumferential shape and circumferential dimension corresponding to that of the first component and second component;
   the first member comprises a mating surface and a through-hole perpendicular to the mating surface, with a circumferential shape and circumferential dimension corresponding to that of the first component and second component; and
   the mating surface of the first member contacts the mating surface of the second member, the through-hole in the first member is aligned with the recess in the second member to form a continuous bore, and the first component is axially positioned partially within the recess and partially within the through-hole so that the planar faces of the first component and second component form a planar magnetic junction within the recess and offset from a junction between mating surfaces of the first and second members.

2. The article of claim 1, wherein the second component is a magnet.

3. The article of claim 1, wherein the article is selected from the group consisting of cubicles, partitions, carts, tables, chairs, bed frames, frames, desks, dressers, chests, shelving units, vanities, free-standing cabinets, wall-mounted cabinets, and kitchen cabinets.

4. The article of claim 1, wherein the first component is a magnet.

5. The article of claim 1, wherein both the first component and the second component are magnets.

6. The article of claim 1, wherein the planar faces of the first component and second component contact each other within the recess.

* * * * *